(12) United States Patent
Rietman et al.

(10) Patent No.: US 6,904,328 B2
(45) Date of Patent: Jun. 7, 2005

(54) LARGE SCALE PROCESS CONTROL BY DRIVING FACTOR IDENTIFICATION

(75) Inventors: Edward A. Rietman, Nashua, NH (US); Jill P. Card, West Newbury, MA (US)

(73) Assignee: Ibex Process Technology, Inc., Lowell, MA (US)

( * ) Notice: Subject to any disclaimer, the term of this patent is extended or adjusted under 35 U.S.C. 154(b) by 207 days.

(21) Appl. No.: 10/244,154

(22) Filed: Sep. 13, 2002

(65) Prior Publication Data

US 2003/0093762 A1 May 15, 2003

Related U.S. Application Data

(60) Provisional application No. 60/322,403, filed on Sep. 14, 2001.

(51) Int. Cl.[7] ............................................. G06F 19/00
(52) U.S. Cl. ............................. 700/97; 700/33; 700/44
(58) Field of Search .............................. 700/33, 44, 32, 700/51, 28–29, 30, 95, 97

(56) References Cited

U.S. PATENT DOCUMENTS

| | | | |
|---|---|---|---|
| 5,467,883 A | 11/1995 | Frye et al. | |
| 5,559,690 A | 9/1996 | Keeler et al. | |
| 5,654,903 A | 8/1997 | Reitman et al. | |
| 5,740,033 A | 4/1998 | Wassick et al. | |
| 6,249,712 B1 * | 6/2001 | Boiquaye | 700/31 |
| 6,268,226 B1 | 7/2001 | Angell et al. | |
| 6,442,515 B1 * | 8/2002 | Varma et al. | 703/22 |
| 6,445,963 B1 * | 9/2002 | Blevins et al. | 700/44 |
| 6,532,454 B1 * | 3/2003 | Werbos | 706/14 |

FOREIGN PATENT DOCUMENTS

| | | | |
|---|---|---|---|
| DE | 196 37 917 A1 | 3/1998 | G05B/13/04 |
| WO | WO 01/57605 | 8/2001 | G05B/13/04 |

OTHER PUBLICATIONS

Card et al., "Impacts of Maintenance Input on the Prediction Accuracy of an APC Controller," Presentation at AEC/APC Symposium XIV (Sep. 9–11, 2002).
Card et al., "Advanced Analysis of Dynamic Neural Control Advisories for Process Optimization and Parts Maintenance," Presentation at AEC/APC Symposium XIV (Sep. 9–11, 2002).
Dillon et al., "Guest Editorial Everyday Applications of Neural Networks," *IEEE Transactions on Neural Networks*, 8:4 (Jul. 1997).
Hatzipantelis et al., "Comparing Hidden Markov Models with Artificial Neural Network Architectures for Condition Monitoring Applications," *Artificial Neural Networks*, 26–28, Conference Publication No. 409 (Jun. 1995).
Konstantopoulos et al., "Controllers with Diagnostic Capabilities. A Neural Network Implementation. Journal of Intelligent and Robotic Systems," Department of Electrical Engineering, University of Notre Dame, IN 12: 197–228 (1995).
Moyne, "AEC/APC Vision: A Research and Suppliers' Point of View," 3rd Annual European AEC/APC Conference Proceedings (2002).

(Continued)

*Primary Examiner*—Kidest Bahta
(74) *Attorney, Agent, or Firm*—Testa, Hurwitz & Thibeault, LLP

(57) ABSTRACT

Systems and methods of complex process control utilize driving factor identification based on nonlinear regression models and process step optimization. In one embodiment, the invention provides a method for generating a system model for a complex process comprised of nonlinear regression models for two or more select process steps of the process where process steps are selected for inclusion in the system model based on a sensitivity analysis of an initial nonlinear regression model of the process to evaluate driving factors of the process.

20 Claims, 20 Drawing Sheets

OTHER PUBLICATIONS

Rietman et al., "A Study on $R^m \rightarrow R^1$ Maps: Application to a 0.16–μm Via Etch Process Endpoint," *IEEE* (2000).

Rietman, "Neural Networks in Plama Processing," *Journal of Vacuum Science and Technology: Part B, IEEE Transactions on Semiconductor Manufacturing*, 14:1 (2001).

Smyth et. al., "Hidden Markov Models an Neural Networks for Fault detection in Dynamic Systems," California Institute of Technology (1993).

Zhang et al, "Control of Spatial Uniformity in Microelectronics Manufacturing: An Integrated Approach," Proceedings of AEC/APC (2000).

Card et al., *Dynamic Neural Control for Plasma Etch Process*, IEEE Transactions on Neural Networks, 1997.

Rietman et al., *A System Model for Feedback Control and Analysis of Yield: A Multistep Process Model of Effective Gate Length, Poly Line Width, and IV Parameters*, IEEE, 2001.

Kim et al., *Intelligent Control of Via Formation by Photosensitive BCB for MCM–L/D Applications*, IEEE Transactions on Semiconductor Manufacturing, 12:503, 1999.

* cited by examiner

US 6,904,328 B2

LARGE SCALE PROCESS CONTROL BY DRIVING FACTOR IDENTIFICATION

CROSS REFERENCE TO RELATED APPLICATIONS

The present application claims the benefit of and priority to copending U.S. provisional application No. 60/322,403, filed Sep. 14, 2001, the entire disclosure of which is herein incorporated by reference.

FIELD OF THE INVENTION

The invention relates to the field of data processing and process control. In particular, the invention relates to the neural network control of complex processes.

BACKGROUND

The manufacture of semiconductor devices requires hundreds of processing steps. In turn, each process step may have several controllable parameters, or inputs, that effect the outcome of the process step, subsequent process steps, and/or the process as a whole. The typical semiconductor device fabrication process thus has a thousand or more controllable inputs that may impact process yield. Process models that attempt to include all process inputs and/or provide intelligent system models of each process are generally impractical for process control in terms of both computational time and expense. As a result, practical process control requires a process model that excludes process steps and inputs that do not have a significant impact on process yield.

SUMMARY OF THE INVENTION

The present invention provides a method of complex process control by driving factor identification using nonlinear regression models and process step optimization. The present invention further provides methods for generating a model for a complex process by driving factor identification using nonlinear regression models.

In one aspect, the invention provides a method for generating a system model for a complex process comprised of a plurality of sequential process steps. In one embodiment, the invention performs a sensitivity analysis for an initial nonlinear regression model of the process. The sensitivity analysis determines the sensitivity of outputs of the initial nonlinear regression model to the inputs. The outputs comprise process metrics and the inputs comprise process step parameters.

In one embodiment, the method selects process steps based on the sensitivity of one or more process metrics with respect to the process step parameters for an individual process step. The process steps parameters that most significantly impact one or more process metrics are identified as driving factors for the process. The process steps associated with a driving factor are selected to generate a system model for the process. The method then generates a system process model comprising nonlinear regression models for each of the selected process steps.

As used herein, the term "metric" refers to any parameter used to measure the outcome or quality of a process, process step, or process tool. Metrics include parameters determined both in situ, i.e., during the running of a process, process step, or process tool, and ex situ, at the end of a process, process step, or process tool use.

As used herein, the term "process step parameter" includes, but is not limited to, process step operational variables, process step metrics, and statistical process control ("SPC") information for a process step. It should be understood that acceptable values of process step parameters include, but are not limited to, continuous values, discrete values and binary values.

As used herein, the term "process step operational variables" includes process step controls that can be manipulated to vary the process step procedure, such as set point adjustments (referred to herein as "manipulated variables"), variables that indicate the wear, repair, or replacement status of a process step component(s) (referred to herein as "replacement variables"), and variables that indicate the calibration status of the process step controls (referred to herein as "calibration variables"). Accordingly, it should be recognized that process step operational variables also encompass process tool operational variables.

In one embodiment, the process model comprises a cascade of the nonlinear regression models for one or more of the selected process steps. For example, in one embodiment, one or more of the outputs of a process-step nonlinear regression model are used as inputs for the nonlinear regression model of the selected process step that is next in the process. The outputs of the nonlinear regression model may comprise process-step metrics and/or process-step SPC information. The output of the nonlinear regression model for the selected process step that is last in the process contains one or more process metrics. The inputs to the nonlinear regression models comprise process-step operational variables and may comprise one or more outputs from the preceding selected process step.

The method of generating a system model for a process may further comprise performing a sensitivity analysis for one or more of the nonlinear regression models of the selected process steps. The sensitivity analysis determines the sensitivity of one or more process metrics to the input variables. The output variables comprise process metrics.

In one embodiment, the input variables comprise process-step operational variables. The method then selects one or more process tools of the process step based on the sensitivity of one or more outputs with respect to the input variables associated with an individual process tool. Those input variables parameters that most significantly impact one or more process metrics are identified as driving factors for the process step. The process tools associated with a driving factor may be selected to generate a model for the associated process step.

In another embodiment, the input variables comprise process-step operational variables and variables assigned to specific process tools. The method then selects one or more process tools of the process step based on the sensitivity of one or more outputs with respect to the input variables. Those process tools that most significantly impact one or more process metrics are identified as driving factors for the process step. Once again, the process tools associated with a driving factor may be selected to generate a model for the associated process step.

In another aspect, the present invention provides a method of process prediction and optimization for a process comprising a plurality of sequential process steps. The method provides for the process a system model composed of a nonlinear regression model for each of one or more process steps that have been selected based on a sensitivity analysis of an initial nonlinear regression model for the entire process. The selected process steps comprise those associated with a driving factor for the process. In one embodiment, the input of a process-step nonlinear regression model comprises operational variables for that process step. In another embodiment, one or more of the outputs of a process-step nonlinear regression model are also used as inputs for the nonlinear regression model of the selected process step that is next in the process. The output of the process model (comprising process-step models) is one or more process metrics. The method then uses the system process model to determine values for the operational variables of the selected process steps that produce one or more predicted process metrics that are as close as possible to one or more target process metrics.

In one embodiment, the method provides a system model for a process comprising: (1) nonlinear regression models for each of one or more process steps that have been selected based on a sensitivity analysis of an initial nonlinear regression model for the process; and (2) nonlinear regression models for each of one or more process tools of selected process steps that have been selected based on a sensitivity analysis of a nonlinear regression model for a process step. The selected process steps comprise those associated with a driving factor for the process. The selected process tools comprise those associated with a driving factor for the associated process step. The input of a process-step nonlinear regression model may comprise process-step operational variables for that process step. Alternatively, one or more of the outputs of a process-step nonlinear regression model may also be used as inputs for the nonlinear regression model of the selected process step that is next in the process. The output of the system process model is one or more process metrics. The method then uses the system process model to determine values for the operational variables of the selected process steps and selected process tools that produce one or more predicted process metrics that are as close as possible to one or more target process metrics.

Another aspect of the invention concerns cost functions. In one embodiment, the system process models of the aspects of the invention set forth above further comprise optimization of the operational variables of the selected process steps with respect to a cost function for the selected process steps. In other embodiments, the system process models further comprise optimization of the operational variables of the selected process tools with respect to a cost function for the selected process tools. The optimizer determines values for the operational variables of the selected process steps (and/or process tools) that fall within a constraint set and that produce at the substantially lowest cost a predicted process metric that is substantially as close as possible to a target process metric. Suitable optimizers include, for example, multidimensional optimizers such as genetic algorithms.

The cost function can be representative, for example, of the actual monetary cost, or the time and labor, associated with achieving a process metric. The cost function may also be representative of an intangible such as, for example, customer satisfaction, market perceptions, or business risk. Accordingly, it should be understood that it is not central to the present invention what, in actuality, the cost function represents; rather, the numerical values associated with the cost function may represent anything meaningful in terms of the application. Thus, it should be understood that the "cost" associated with the cost function is not limited to monetary costs. The constraint set is defined by one or more ranges of acceptable values for the operational variables of the selected process steps and/or process tools.

In other aspects, the present invention provides systems adapted to practice the methods of the invention set forth above. In one embodiment, the system comprises a process monitor and a data processing device. The process monitor may comprise any device that provides information on process step parameters and/or process metrics. The data processing device may comprise an analog and/or digital circuit adapted to implement the functionality of one or more of the methods of the present invention using at least in part information provided by the process monitor. The information provided by the process monitor can be used directly to measure one or more process metrics, process step parameters, or both, associated with a process or process step. The information provided by the process monitor can also be used directly to train a nonlinear regression model in the relationship between one or more of process step parameters and process metrics, and process step operational variables and process step metrics (e.g., by using process parameter information as values for variables in an input vector and metrics as values for variables in a target output vector) or used to construct training data set for later use. In addition, in one embodiment, the systems of the present invention are adapted to conduct continual, on-the-fly training of the nonlinear regression model.

In another embodiment, the system further comprises a process tool controller in electronic communication with the data processing device. The process tool controller may be any device capable of adjusting one or more process or sub-process operational variables in response to a control signal from the data processing device.

In some embodiments, the data processing device may implement the functionality of the methods of the present invention as software on a general purpose computer. In addition, such a program may set aside portions of a computer's random access memory to provide control logic that affects one or more of the measuring of process step parameters, the measuring of process metrics, the measuring of process step metrics, the measuring of process step operational parameters, the measuring of process tool parameters; the provision of target metric values, the provision of constraint sets, the prediction of metrics, the implementation of an optimizer, determination of operational variables, generation of a system model from process-step models of selected process steps, and generation of a sub-system model (e.g., process-step model) from process-tool models of selected process tools. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

In a further aspect, the present invention provides an article of manufacture where the functionality of a method of the present invention is embedded on a computer-readable medium, such as, but not limited to, a floppy disk, a hard disk, an optical disk, a magnetic tape, a PROM, an EPROM, CD-ROM, or DVD-ROM.

BRIEF DESCRIPTION OF THE DRAWINGS

A fuller understanding of the advantages, nature and objects of the invention may be had by reference to the FIGS. 1A–1C are a flow diagram illustrating various embodiment of generating a system model according to the present invention.

DETAILED DESCRIPTION

Figure 1A:
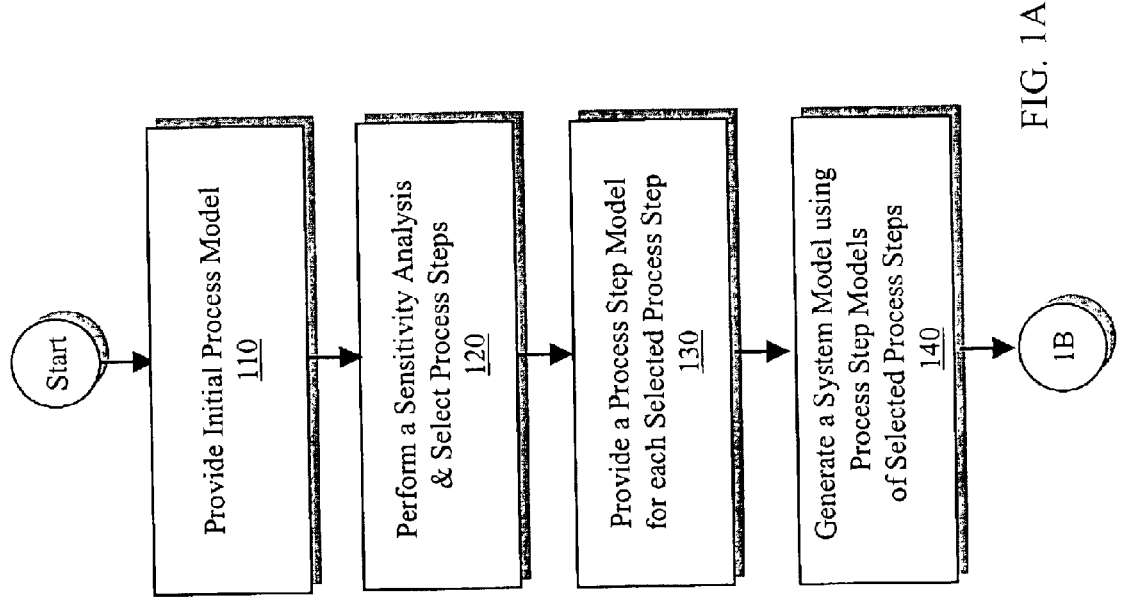
Figure 1B:
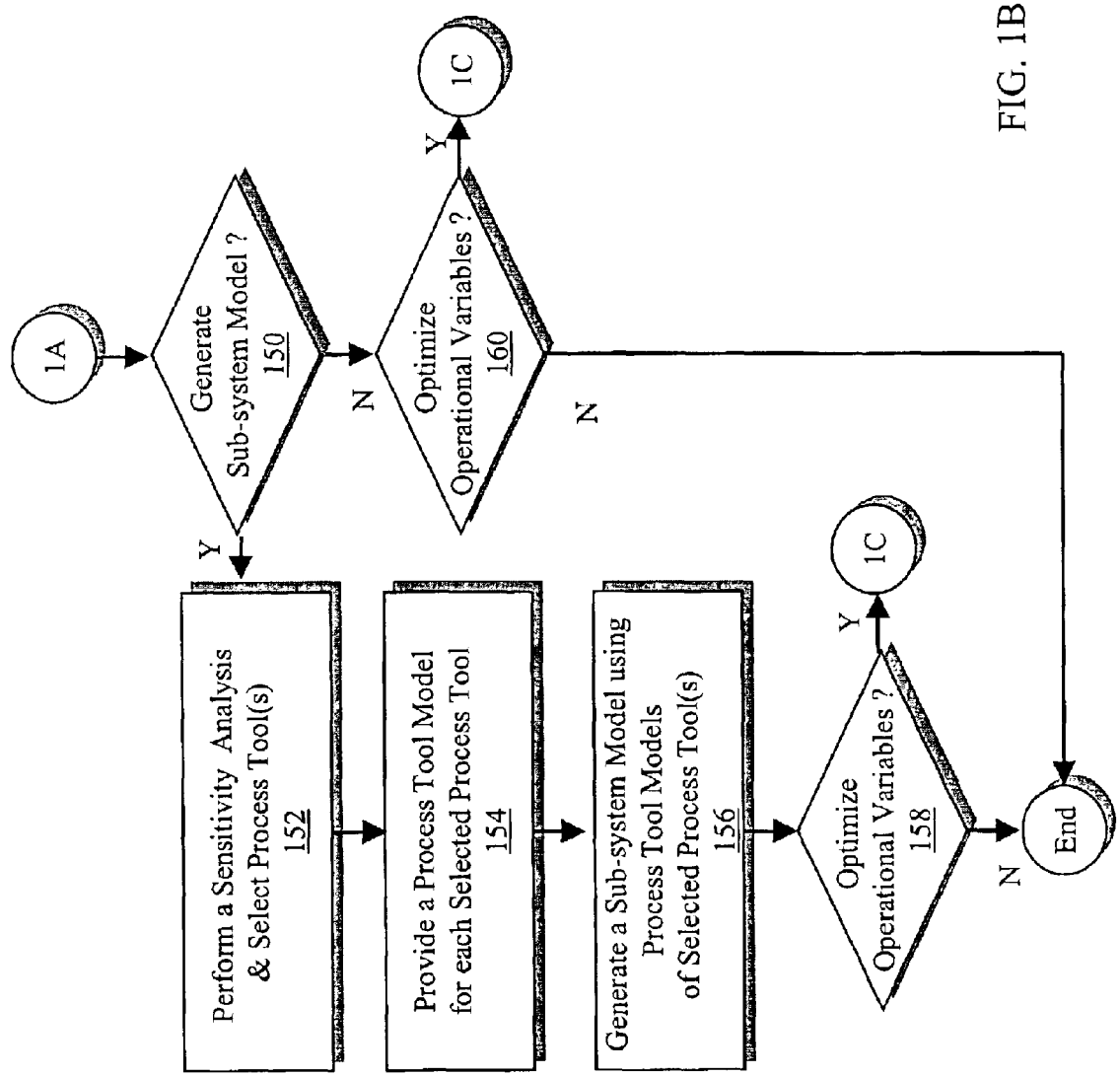
Figure 1C:
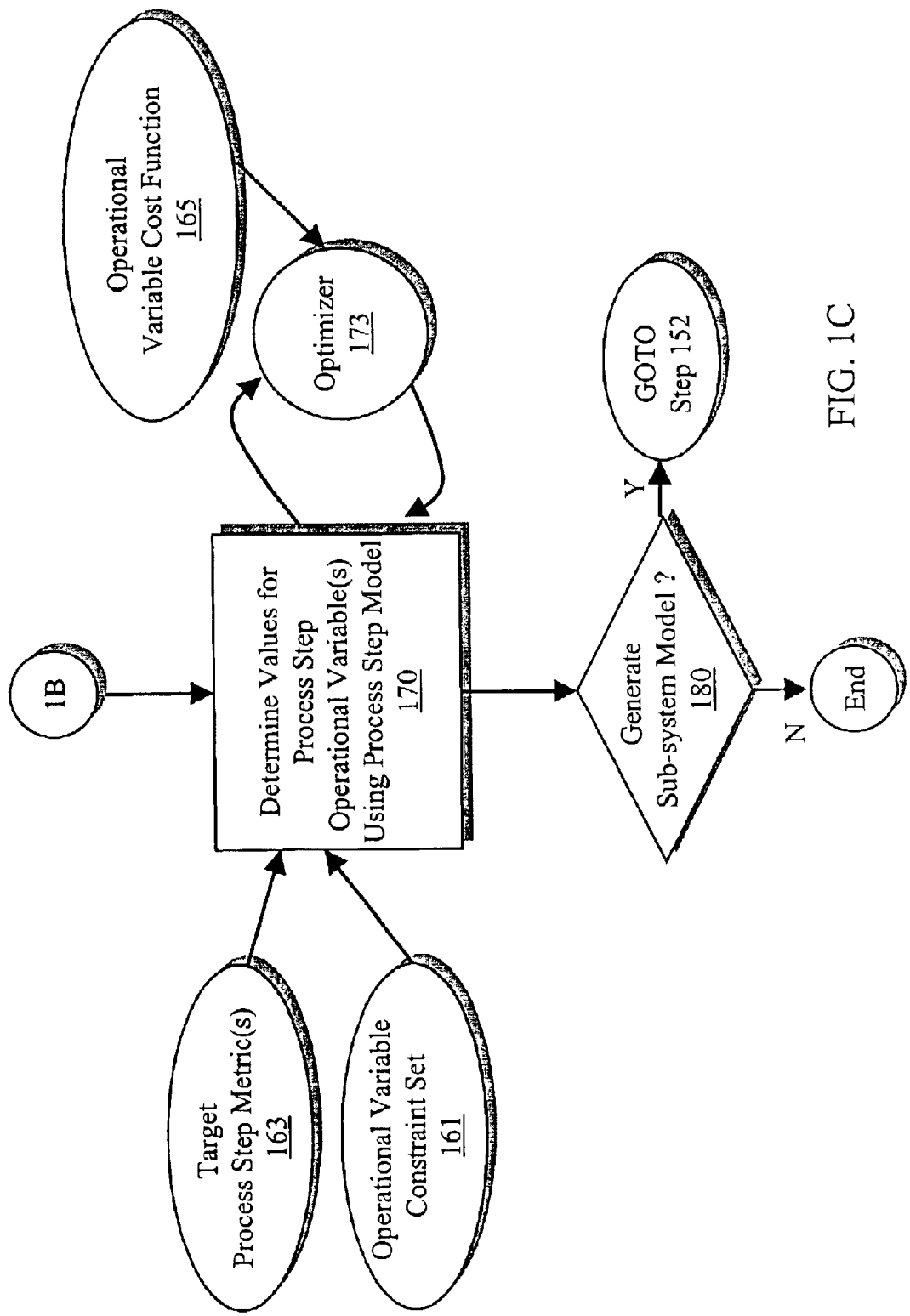

Referring to FIGS. 1A–1C, a flow chart of various embodiments of generating a system model according to the present invention is shown. The method begins by providing an initial process model (box 110). Preferably, the initial process model comprises a nonlinear regression model that has been trained in the relationship between inputs comprising one or more process step parameters and outputs comprising one or more process metrics. The inputs may comprise, for example, process-step operational variables, process-step metrics, and combinations thereof. The method proceeds with performing a sensitivity analysis to ascertain the sensitivity of the outputs of the initial process model on the inputs (box 120). In one embodiment, the sensitivity analysis comprises evaluating response curves (surfaces) of the outputs on the inputs. In another embodiment, the sensitivity analysis comprises evaluating Pareto chart information. In yet another embodiment, the sensitivity analysis comprises evaluating both one or more response surfaces and one or more sets of Pareto chart information.

The method then selects process steps for inclusion in a system model based on the sensitivity of one or more outputs on one or more parameters (inputs) associated with the process step. For example, the system model may be constructed based on the n number of inputs on which the outputs are most sensitive. The number n may be a certain number, a number such that at least minimum number of process steps are included in the system model, a number such that no more than a maximum number of process steps are included in the system model, a number such that a certain process step is included in the system model, or combinations of the foregoing. The system may be constructed, for example, based on all parameters (inputs) on which the outputs are sensitive above a certain absolute threshold level and/or relative threshold level. The process steps that are thus selected are identified as containing driving factors (e.g., process-step parameters on which the process outputs are significantly sensitive) for the process.

The method then provides for each selected process step a process-step model (box 130). Preferably, each process-step model comprises a nonlinear regression model that has been trained in the relationship between inputs comprising one or more operational variables of the process step and outputs comprising one or more process step outputs. The process-step outputs may comprise, for example, process-step metrics, process-step SPC information, and combinations thereof. A system model of the process is then generated using the process-step models of the selected process steps (box 140).

In one embodiment, a system model is generated where the input to a process-step model comprises the output from one or more process-step models of selected process steps that are prior in the sequence of process steps. In another embodiment, outputs from one or more process-step models of the selected process steps serve as inputs to a model the outputs of which are one or more process metrics. For example, one or more outputs of the process-step models of the selected process steps may serve as inputs into a nonlinear regression model that has been trained in the relationship between at least these inputs and the metrics of the process.

In all of the embodiments of the present invention, a nonlinear regression model that has been trained in the relation between a set of inputs and a set of outputs can be provided, for example, through the training of the nonlinear regression model against measured inputs and outputs.

In various embodiments, a nonlinear regression model for use in the present invention comprises a neural network. Specifically, in one version, the neural network model and training is as follows. The output of the neural network, r, is given by $$r_k = \sum_j \left[ W_{jk} \cdot \tanh\left( \sum_i W_{ij} \cdot x_i \right) \right].$$ Eq. (1)

This equation states that the $i^{th}$ element of the input vector x is multiplied by the connection weights $W_{ij}$. This product is then the argument for a hyperbolic tangent function, which results in another vector. This resulting vector is multiplied by another set of connection weights $W_{jk}$. The subscript i spans the input space (e.g., the input variables). The subscript j spans the space of hidden nodes, and the subscript k spans the output space (e.g., the output variables). The connection weights are elements of matrices, and may be found, for example, by gradient search of the error space with respect to the matrix elements. The response error function for the minimization of the output response error is given by $$C = \left[\sum_j (t-r)^2\right]^{\frac{1}{2}} + \gamma \|W\|^2. \qquad \text{Eq. (2)}$$

The first term represents the root-square-error (RSE) between the target t and the response r. The second term is a constraint that minimizes the magnitude of the connection weight W. If γ (called the regularization coefficient) is large, it will force the weights to take on small magnitude values. With this weight constraint, the response error function will try to minimize the error and force this error to the best optimal between all the training examples. The coefficient γ thus acts as an adjustable parameter for the desired degree of the nonlinearity in the model.

The sensitivity analysis step of the present invention can take many forms. In one embodiment, the sensitivity analysis constructs response curves (surfaces) from which the sensitivity of one or more outputs of a nonlinear regression model of the present invention (e.g., an initial process model, a process-step model) on the inputs of the model. In another embodiment, the sensitivity analysis constructs a Pareto chart or bar chart from which the sensitivity of one or more outputs of a nonlinear regression model of the present invention (e.g., an initial process model, a process-step model) on the inputs of the model. The response curve and Pareto approaches may, if desired, be combined.

Figure 10:
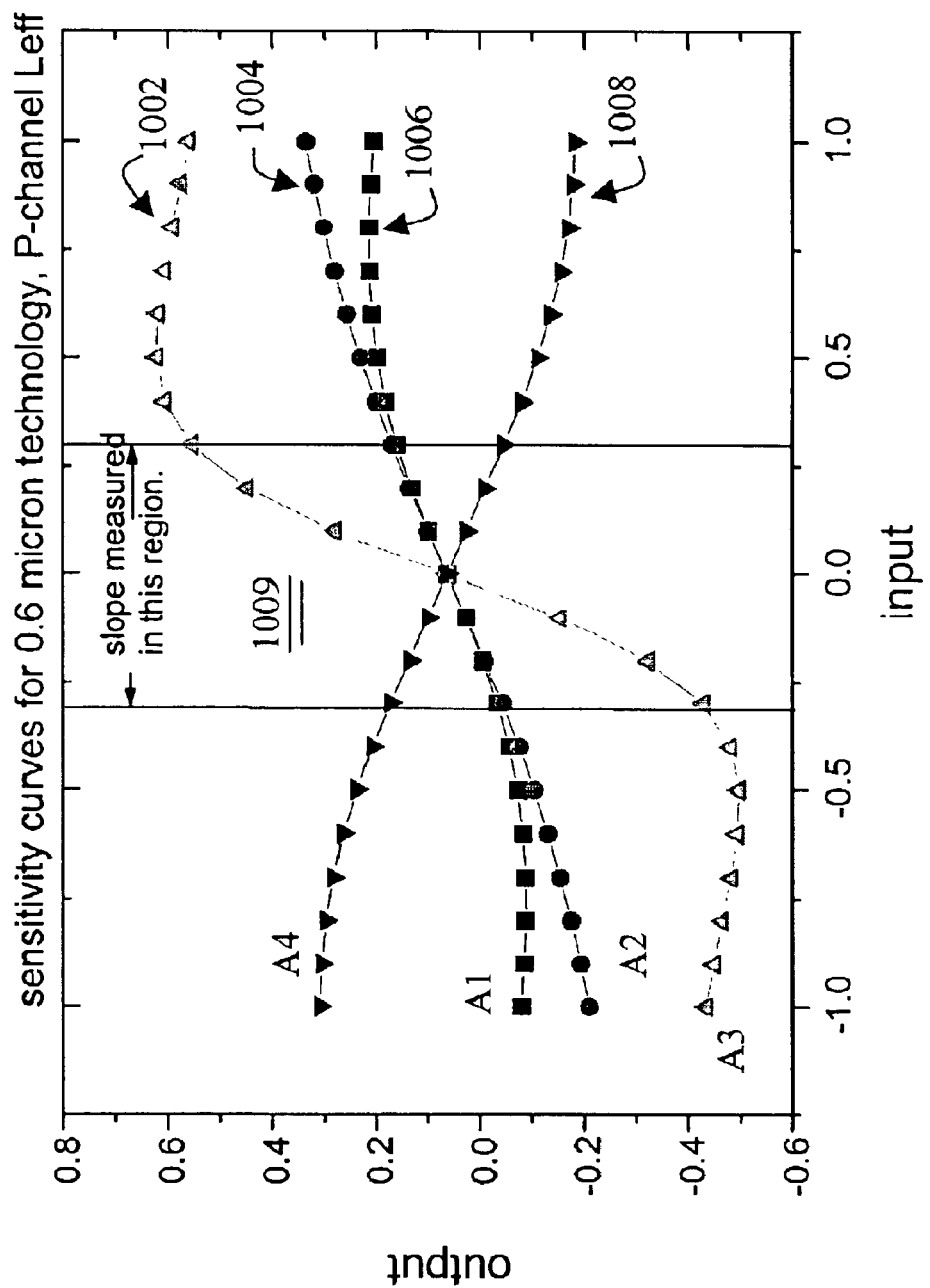
FIG. 10 illustrates four sensitivity curves determined in an embodiment of the response curve approach to the sensitivity analysis of the initial process model of the Example.
Figure 11:
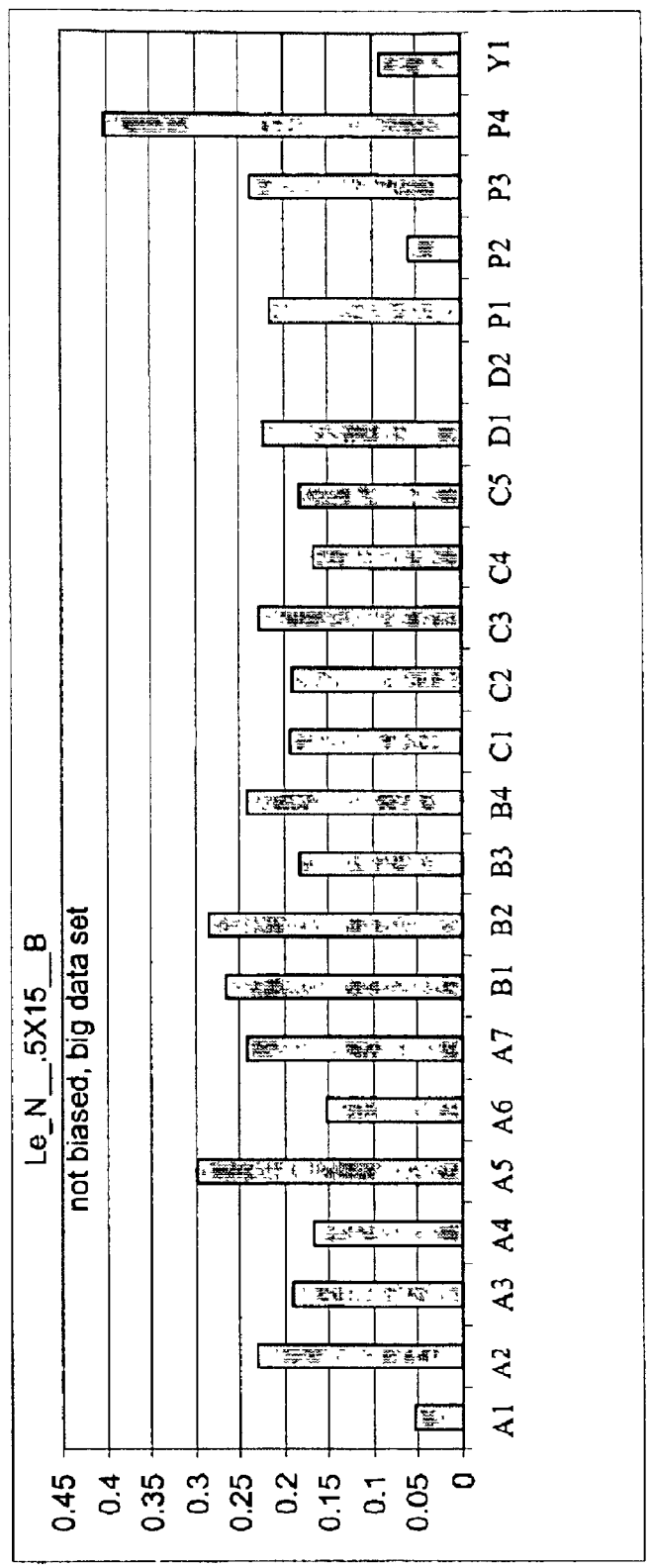
FIGS. 11–15 are Pareto charts (one for each output) of the individual process steps, x-axis, of the process.
Figure 12:
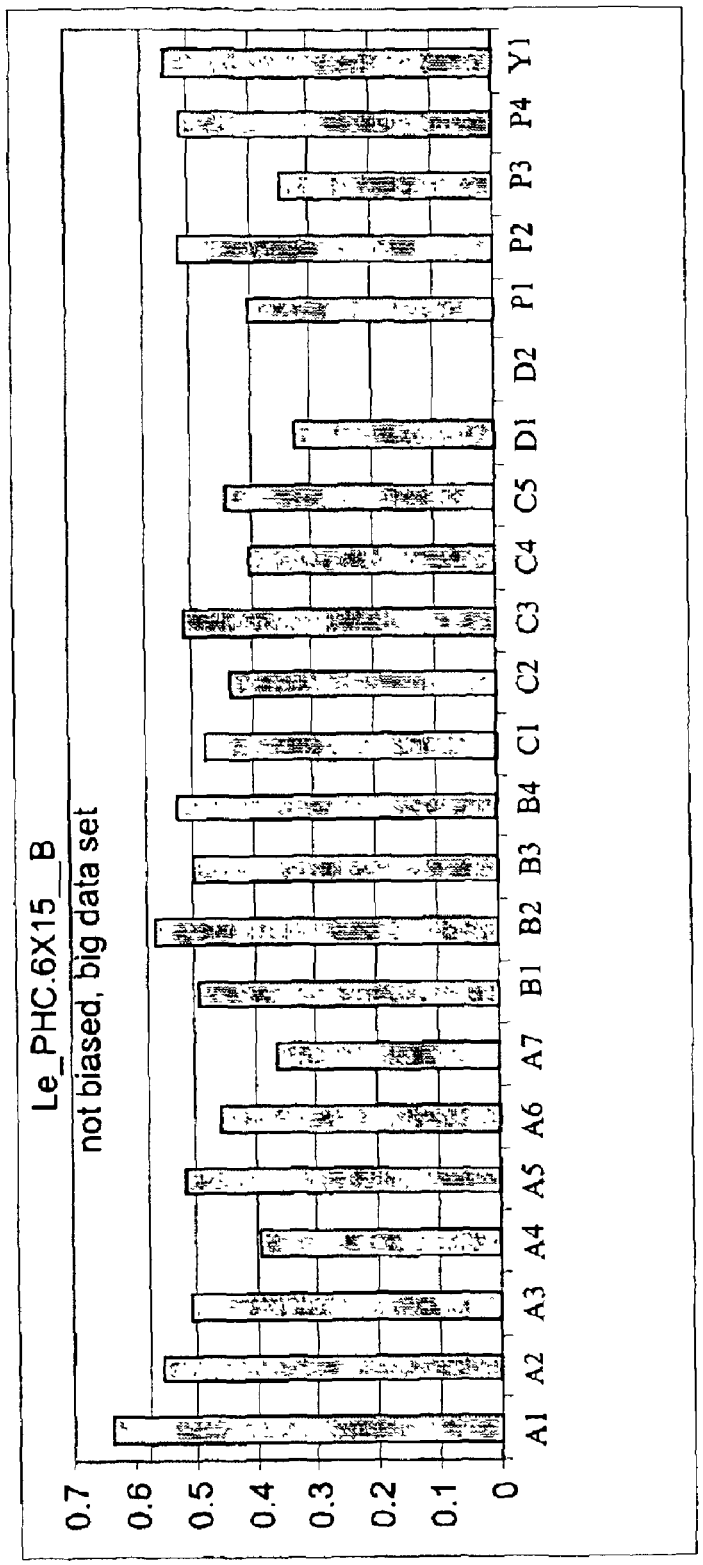
Figure 13:
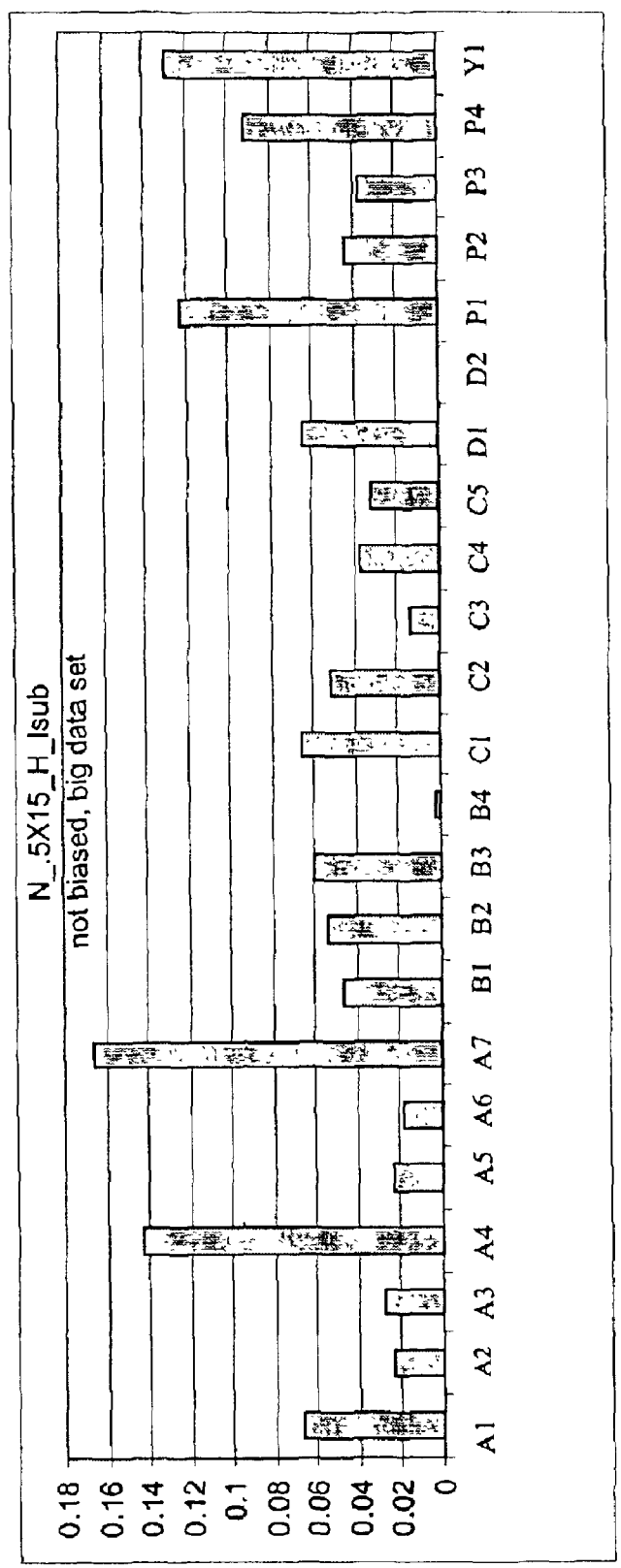
Figure 14:
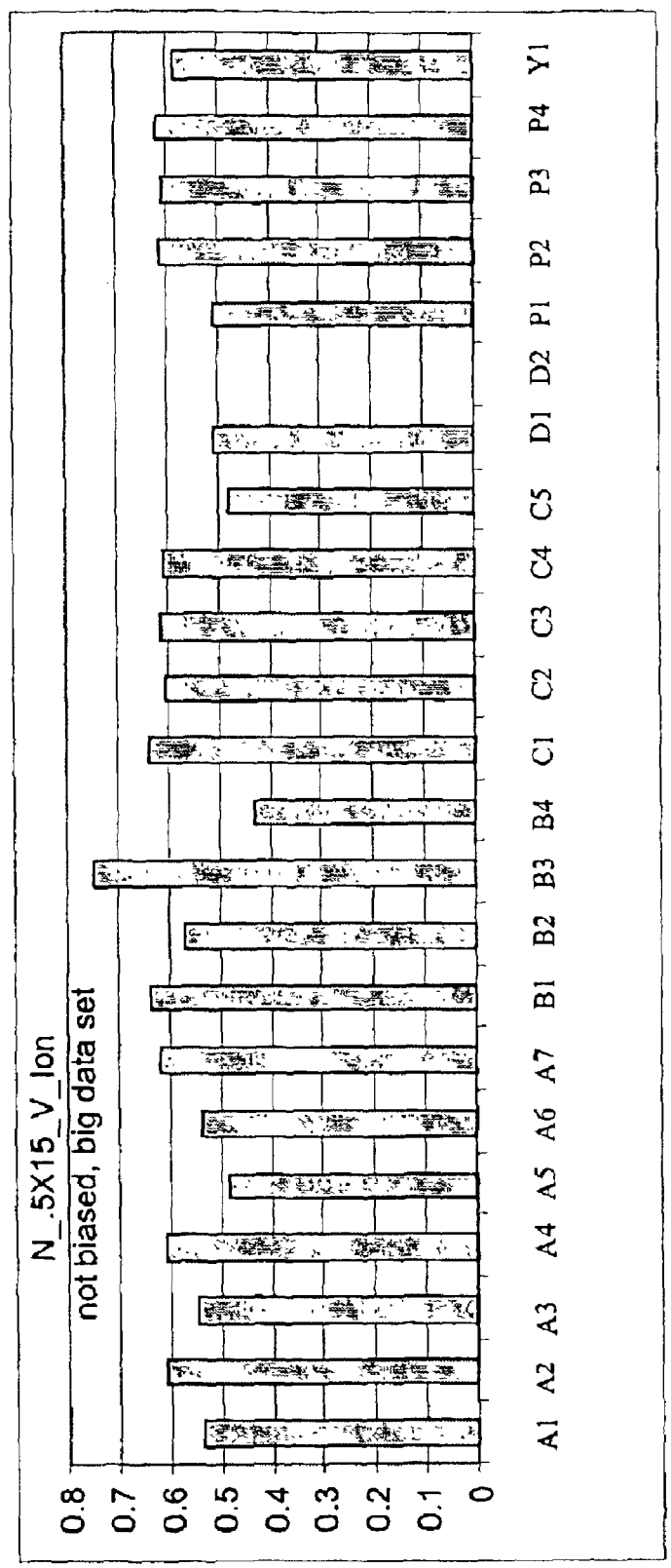
Figure 15:
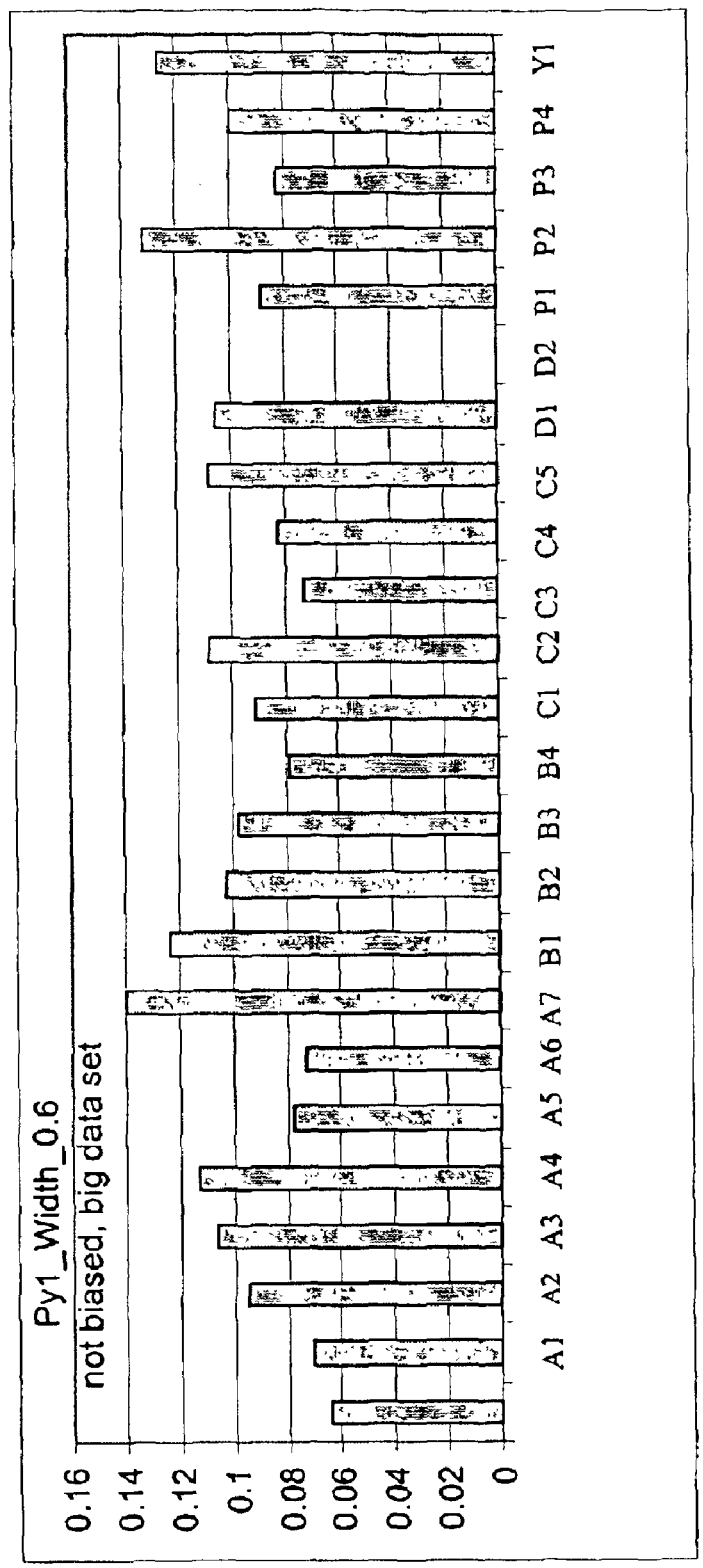

In one embodiment of the response curve approach, the sensitivity of the output of the initial process model with respect to the inputs is found from the partial derivative of the particular input of interest while holding the other inputs constant. The observed output is then recorded. By repeating this process for all the inputs it is possible to assemble response curves. For example, in one embodiment, the procedure comprises using a mean vector of the inputs and making small, incremental changes on the input of interest while recording the output. The first input, for example, is selected and a small value is added to it. All the other inputs are at their mean value, which typically are very close to zero for normalized inputs. The vector is then fed forward to compute the output of the initial process model. Further small values are added and the outputs are collected. The final results may be represented as a curve of the change in the input value versus the network output. An example of such a curve is shown in FIG. 10 and discussed in more detail below.

In one embodiment of the Pareto approach, the importance of the inputs on the output of the initial process model are ranked and presented in a bar chart known as a Pareto chart. Usually, the number of bars in the chart is equal to the number of inputs. Each bar represents the average sensitivity of the associated input. In one embodiment, Pareto charts are constructed by using real database vectors, adding a small quantity to one of the inputs and observing the output. Using this procedure, a matrix of the derivative of the response with respect to the input is created for the elements of each input vector. Each row in the database produces one row in the sensitivity matrix. The number of columns in the sensitivity matrix equals the total number of inputs to the initial process model, and the elements in the matrix are substantially the derivative of the output with respect to the derivative of the input. The columns of the matrix are then averaged. The derivatives may be signed so the absolute value is taken for each element in the vector of average derivatives. The resulting vector is used to construct the bar chart. Examples of such charts are shown in FIGS. 11 to 15, which are discussed in more detail below.

Referring again to FIGS. 1A–1C, in various embodiments the methods of the present invention may further comprise generating a model for one or more selected process steps, i.e., a sub-system model ("YES" to query 150). In one embodiment, generating a model of a process step comprises performing a sensitivity analysis to ascertain the sensitivity of the outputs of the process-step model on the input variables associated with one or process tools that comprise the process step (box 152). In one embodiment, the sensitivity analysis comprises evaluating response curves (surfaces) of the outputs on the inputs. In another embodiment, the sensitivity analysis comprises evaluating Pareto chart information. In yet another embodiment, the sensitivity analysis comprises evaluating both one or more response surfaces and one or more sets of Pareto chart information.

The method then selects process tools for inclusion in a sub-system model for the process step based on the sensitivity of one or more outputs on one or more parameters (inputs) associated with the process tools (still box 152). For example, the system model may be constructed based on the number n of inputs on which the outputs are most sensitive. For example, the number n may be a number such that at least minimum number of process tools are included in the sub-system model, a number such that no more than a maximum number of process tools are included in the sub-system model, a number such the a certain process tool is included in the sub-system model, or combinations of the foregoing. The sub-system model may be constructed, for example, based on all parameters (inputs) on which the outputs are sensitive above a certain absolute threshold level and/or a relative threshold level.

The method then provides for each selected process tool a process-tool model (box 154). Preferably, each process-tool model comprises a nonlinear regression model that has been trained in the relationship between inputs comprising one or more operational variables of the process tool and outputs comprising one or more process-step outputs. The process-step outputs may comprise, for example, process-step metrics, process-step SPC information, and combinations thereof. A system model of the process step is then generated using the process-tool models of the selected process tools (box 156).

In one embodiment, a system model is generated whereby the input to a process-tool model comprises the output from one or more process-tool models of selected process tools that are prior in the sequence of processing in the process step. In another embodiment, outputs from one or more process-tool models of the selected process tools serve as inputs to a model the outputs of which are one or more process-step metrics. For example, one or more outputs of the process-tool models of the selected process tools may serve as inputs into a nonlinear regression model that has been trained in the relationship between at least these inputs and the metrics of the process step.

Referring again to FIGS. 1A–1C, in various embodiments the methods of the present invention may further comprise optimizing the operational variable values for one ore more selected process steps ("YES" to either query 158 or 160). Referring to FIG. 1C, the method begins by providing one or more target process step metrics 161, an acceptable range of values for the operational variables to define an operational variable constraint set 163, and a cost function 165 for the operational variables. Using the process-step model provided (e.g., as in step 156) the process step operational variables are optimized using the process-step model and an optimizer 173 to determine values for the process step operational variables that are within the operational variable constraint set 163, and that produce at the lowest cost a process stp metric(s) that is as close as possible to the target process metric(s) 161. It should be recognized that operational variable optimization may be conducted for multiple process steps and that optimization separate from, also proceed (e.g., certain embodiments comprising "YES" to query 180) or follow sub-system model generation.

In all of the embodiments of the present invention, the cost function can be representative, for example, of the actual monetary cost, or the time and labor, associated with achieving a sub-process metric. The cost function can also be representative of an intangible such as, for example, customer satisfaction, market perceptions, or business risk. Accordingly, it should be understood that it is not central to the present invention what, in actuality, the cost function represents; rather, the numerical values associated with the cost function may represent anything meaningful in terms of the application. Thus, it should be understood that the "cost" associated with the cost function is not limited to monetary costs.

The condition of lowest cost, as defined by the cost function, is the optimal condition, while the requirement of a metric or operational variable to follow defined cost functions and to be within accepted value ranges represents the constraint set. Cost functions are preferably defined for all input and output variables over the operating limits of the variables. The cost function applied to the vector z of n input and output variables at the nominal (current) values is represented as $f(z)$ for $z \in \Re^n$.

For input and output variables with continuous values, a normalized cost value is assigned to each limit and an increasing piecewise linear cost function assumed for continuous-variable operating values between limits. For variables with discrete or binary values, the cost functions are expressed as step functions.

The optimizer determines process-step (and/or process-tool) operational-variable values that are always within the constraint set and are predicted to achieve a process-step metric as close to the target process-step metric as possible while maintaining the lowest cost feasible. The optimization procedure begins by setting an acceptable range of values for the process-step (and/or process-tool) operational variables to define a constraint set and by setting one or more target process-step metrics. The optimization procedure then optimizes the process-step (and/or process-tool) operational variables against a cost function for the process step with the added constraints to, for example, improve yield at the end of the line.

In one embodiment, the optimization model (or method) comprises a genetic algorithm. In another embodiment, the optimization is as for Optimizer I described below. In another embodiment, the optimization is as for Optimizer II described below. In another embodiment, the optimization strategies of Optimization I are utilized with the vector selection and pre-processing strategies of Optimization II.

The condition of lowest cost, as defined by the cost function, is the optimal condition, while the requirement of all process-step (and/or process-tool) operational variables to follow defined cost functions and to be within accepted value ranges represents the constraint set. Cost functions are preferably defined for all input and output variables over the operating limits of the variables. The cost function applied to the vector z of n input and output variables at the nominal (current) values is represented as $f(z)$ for $z \in \Re^n$.

For input and output variables with continuous values, a normalized cost value is assigned to each limit and an increasing piecewise linear cost function is assumed for continuous variable operating values between limits. For variables with discrete or binary values, the cost functions are expressed as step functions.

Optimizer I

In one embodiment, the typical optimization problem is stated as follows:

Min $f(z)$ $z \in \Re^n$ s.t. $h(z) = a$ $z^L < z < z^U$ where $f: \Re^n \to \Re$ and $h: \Re^n \to \Re^n$.

Vector z represents a vector of all input and output variable values, $f(z)$, the objective function, and $h(z)$, the associated constraint vector for elements of z. The variable vector z is composed of process-step (and/or process-tool) operational variables inputs, and process metric outputs. The vectors $z^L$ and $z^U$ represent the lower and upper operating ranges for the variables of z.

In one embodiment, the optimization method focuses on minimizing the cost of operation over the ranges of all input and output variables. The procedure seeks to minimize the maximum of the operating costs across all input and output variables, while maintaining all within acceptable operating ranges. The introduction of variables with discrete or binary values requires modification to handle the yes/no possibilities for each of these variables.

The following basic notation is useful in describing this optimization routine.

$m_1$ = the number of continuous input variables.

$m_2$ = the number of binary and discrete variables.

$p$ = the number of output variables.

$m = m_1 + m_2$, the total number of input variables.

$z^{m_1} \in \Re^{m_1}$ = vector of $m_1$ continuous input variables.

$z^{m_2} \in \Re^{m_2}$ = the vector of $m_2$ binary and discrete input variables.

$z^p \in \Re^p$ = the vector of p continuous output variables.

Also let $z \in \Re^n = [z^{m_1}, z^{m_2}, z^p]$, i.e., the vector of all input variables and output variables for a given process run.

As mentioned above, two different forms of the cost function exist: one for continuous variables and another for the discrete and binary variables. In one embodiment, the binary/discrete variable cost function is altered slightly from a step function to a close approximation which maintains a small nonzero slope at no more than one point.

The optimization model estimates the relationship between the set of continuous input values and the binary/discrete variables $[z^{m_1}, z^{m_2}]$ to the output continuous values $[z^p]$. In one embodiment, adjustment is made for model imprecision by introducing a constant error-correction factor applied to any estimate produced by the model specific to the current input vector. The error-corrected model becomes, $$g'(z^{m_1}, z^{m_2}) = g(z^{m_1}, z^{m_2}) + e_0$$

where $e_0 = m_0 + g(z_0^{m_1}, z_0^{m_2})$, and $g(z^{m_1}, z^{m_2})$ = the prediction model output based on continuous, and $g: \Re^{m_1 + m_2} \to \Re^p$ binary and discrete input variables.

$g(z_0^{m_1}, z_0^{m_2})$ = the prediction model output vector based on current input variables.

$m_0 \in \Re^p$ = the observed output vector for the current (nominal) state of inputs.

h(z) = the cost function vector of all input and output variables of a given process run record.

h(z(i)) = the $i^{th}$ element of the cost function vector, for i=1, ..., m+p.

For the continuous input and output variables, cost value is determined by the piecewise continuous function. For the p continuous output variables $$[h(z(m+1)), h(z(m+2)), \ldots, h(z(m+p))] = g(z^{m_1}, z^{m_2}).$$

For h(z), the cost function vector for all the input and output variables of a given process run record, the scalar, max h(z)=max{h(z(i)): i=1, 2, ..., m+p}, is defined as the maximum cost value of the set of continuous input variables, binary/discrete input variables, and output variables.

The optimization problem, in this example, is to find a set of continuous input and binary/discrete input variables which minimize h(z). The binary/discrete variables represent discrete metrics (e.g., quality states such as poor/good), whereas the adjustment of the continuous variables produces a continuous metric space. In addition, the interaction between the costs for binary/discrete variables, $h(z^{m_2})$, and the costs for the continuous output variables $h(z^p)$, are correlated and highly nonlinear. In one embodiment, these problems are addressed by performing the optimization in two parts: a discrete component and continuous component. The set of all possible sequences of binary/discrete metric values is enumerated, including the null set. For computational efficiency, a subset of this set may be extracted. For each possible combination of binary/discrete values, a continuous optimization is performed using a general-purpose nonlinear optimizer, such as dynamic hill climbing or feasible sequential quadratic programming, to find the value of the input variable vector, $z_{opt}^m$, that minimizes the summed total cost of all input and output variables $$\min f(z) = \sum_{i=1}^{m+p} h(z_{opt}(i)).$$

Optimizer II

In another embodiment, a heuristic optimization algorithm designed to complement the embodiments described under Optimizer I is employed. The principal difference between the two techniques is in the weighting of the input-output variable listing. Optimizer II favors adjusting the variables that have the greatest individual impact on the achievement of target output vector values, e.g., the target process metrics. Generally, Optimizer II achieves the specification ranges with a minimal number of input variables adjusted from the nominal. This is referred to as the "least labor alternative." It is envisioned that when the optimization output of Optimizer II calls for adjustment of a subset of the variables adjusted using the embodiments of Optimizer I, these variables represent the principal subset involved with the achievement of the target process metric. The additional variable adjustments in the Optimization I algorithm may be minimizing overall cost through movement of the input variable into a lower-cost region of operation.

In one embodiment, Optimization II proceeds as follows:

Min f(z)

z∈Φ s.t. h(z)=a $z^L \leq z \leq z^U$ where $\Phi = \{z^j \in \Re^n : j \leq s \in I; \text{ an s vector set}\}$ f: $\Re^n \to \Re$ and h: $\Re^n \to \Re^n$ The index j refers to the $j^{th}$ vector of a total of s vectors of dimension n=m+p, the total number of input plus output variables, respectively, which is included in the set to be optimized by f. The determination of s discrete vectors from an original vector set containing both continuous and binary/discrete variables may be arrived at by initial creation of a discrete rate change from nominal partitioning. For each continuous variable, several different rate changes from the nominal value are formed. For the binary variables only two partitions are possible. For example, a continuous variable rate change partition=−0.8 specifies reduction of the input variable by 80% from the current nominal value. The number of valid rate partitions for the m continuous variables is denoted as $n_m$.

A vector z is included in Φ according to the following criterion. (The case is presented for continuous input variables, with the understanding that the procedure follows for the binary/discrete variables with the only difference that two partitions are possible for each binary variable, not $n_m$.) Each continuous variable is individually changed from its nominal setting across all rate-partition values while the remaining m−1 input variables are held at nominal value. The p output variables are computed from the inputs, forming z.

Inclusion of z within the set of vectors to be cost optimized is determined by the degree to which the output variables approach targeted values. The notation $z_{ik}(l) \in \Re$, l=1, 2, ... p, refers to the $l^{th}$ output value obtained when the input variable vector is evaluated at nominal variable values with the exception of the $i^{th}$ input variable which is evaluated at its $k^{th}$ rate partition. In addition, $z_{ik} \in \Re$ is the value of the $i^{th}$ input variable at its $k^{th}$ rate partition from nominal. The target value for the $l^{th}$ output variable l=1, 2, ... p is target (l) and the $l^{th}$ output variable value for the nominal input vector values is denoted $z_0(l)$.

The condition for accepting the specific variable at a specified rate change from nominal for inclusion in the optimization stage is as follows.

For each i≤m, and each k≤$n_m$, if $|(z_{ik}(l) - \text{target}(l))/(z_0(l) - \text{target}(l))| < K(l)$ for 1≤p, 0≤K(l)≤1, and $z^L \leq z_i^j \leq z^U$ then $z_{ik} \in \Delta_i$ = acceptable rate partitioned values of the $i^{th}$ input variable.

To each set $\Delta_i$, i=1, ..., m is added the $i^{th}$ nominal value. The final set Φ of n-dimension vectors is composed of the crossing of all the elements of the sets $\Delta_i$ of acceptable input variable rate-partitioned values from nominal. Thus, the total number of vectors z∈Φ equals the product of the dimensions of the $\Delta_i$.

$$\text{Total vectors} \in \Phi = \left( \prod_i^{m_i} n_i \right) * (2^{m_2})$$

for $m_1$ = the number of continuous input variables $m_2$ = the number of binary and discrete variables.

The vector set Φ resembles a fully crossed main effects model which most aggressively approaches one or more of the targeted output values without violating the operating limits of the remaining output values.

This weighting strategy for choice of input vector construction generally favors minimal variable adjustments to reach output targets. In one embodiment, the Optimization II strategy seeks to minimize the weighted objective function $$f(z^j) = \sum_{i=1}^{m} f(z_i^j) + pV \left( \prod_{i=m+1}^{m+p} f(z_i^j) \right)^{1/p}$$

for pV. The last p terms of z are the output variable values computed from the n inputs. The term $$\left( \prod_{i=m+1}^{m+p} f(z_i^j) \right)^{1/p}$$

is intended to help remove sensitivity to large-valued outliers. In this way, the approach favors the cost structure for which the majority of the output variables lie close to target, as compared to all variables being the same mean cost differential from target.

Values of pV>>3 represent weighting the adherence of the output variables to target values as more important than adjustments of input variables to lower cost structures that result in no improvement in quality.

In another embodiment, Optimization II strategy seeks to minimize the weighted objective function $$f(z^j) = \sum_{i=1}^{m} f(z_i^j) + V \left( \prod_{i=m+1}^{m+p} f(z_i^j) \right)$$

for V. The last p terms of z are the output variable values computed from the n inputs.

Figure 2:
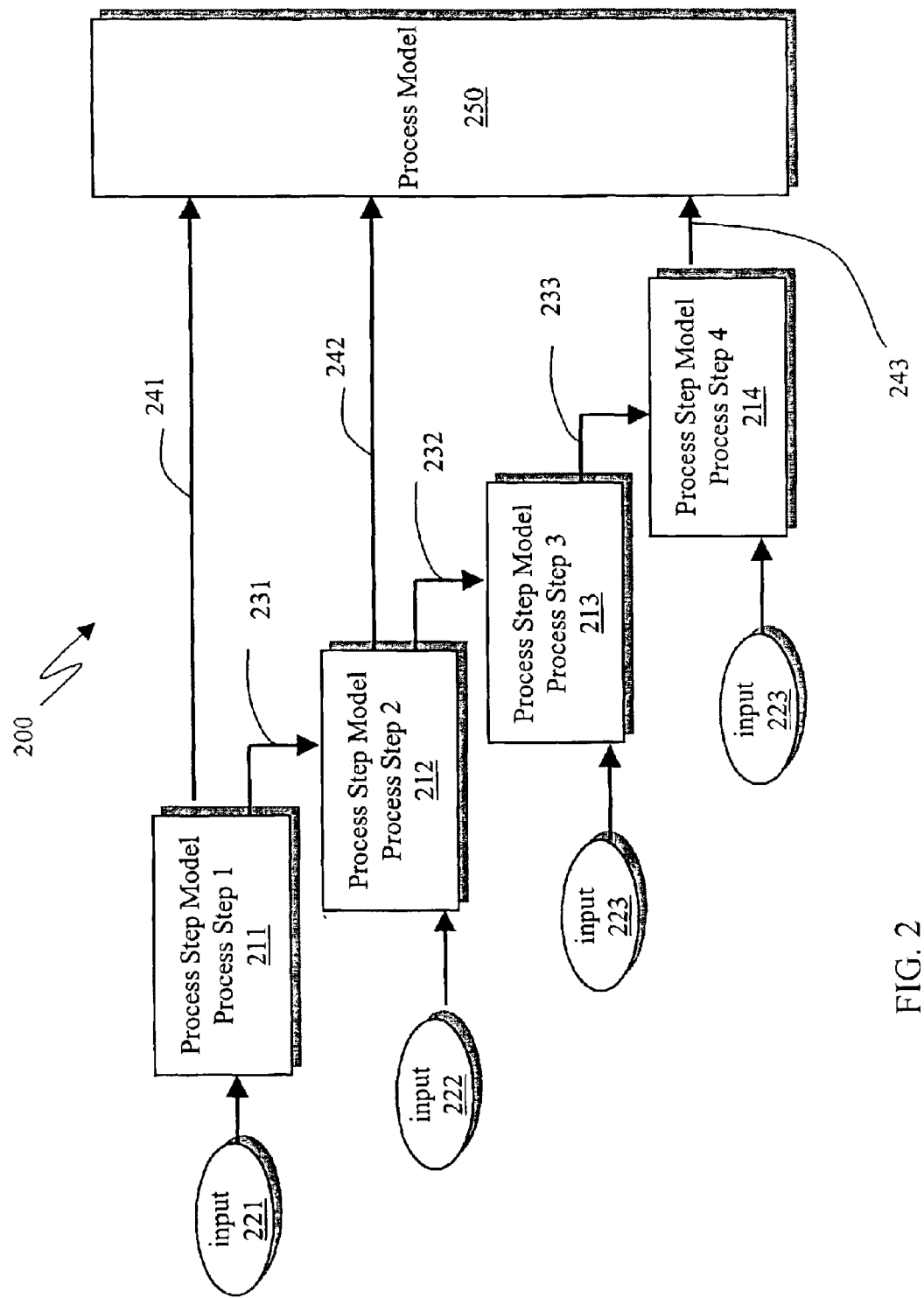
FIG. 2 is a schematic illustration of various embodiments of system models generated according to the present invention.

In another aspect, the present invention provides a system model for a process comprising a plurality of sequential process steps. Referring to FIG. 2, in one embodiment, the system model 200 is composed of nonlinear regression models for each of one or more process steps 211, 212, 213, 214 that have been selected based on a sensitivity analysis of an initial nonlinear regression model for the process. The selected process steps comprise those associated with a driving factor for the process. In one embodiment, the input of a process-step nonlinear regression model comprises process step operational variables 221, 222, 223, 224 for that process step. In another embodiment, one or more of the outputs 231, 232, 233 of a process-step nonlinear regression model are also used as inputs for the nonlinear regression model of the selected process step that is next in the process. In one embodiment, one or more outputs 241, 242, 243 of one or more models of the selected process steps serve as inputs to a process model 250, where the outputs of the process model 250 comprise one or more process metrics. In one embodiment, the invention then uses the system model to determine values for the operational variables of the selected process steps that produce one or more predicted process metrics that are as close as possible to one or more target process metrics.

Figure 3:
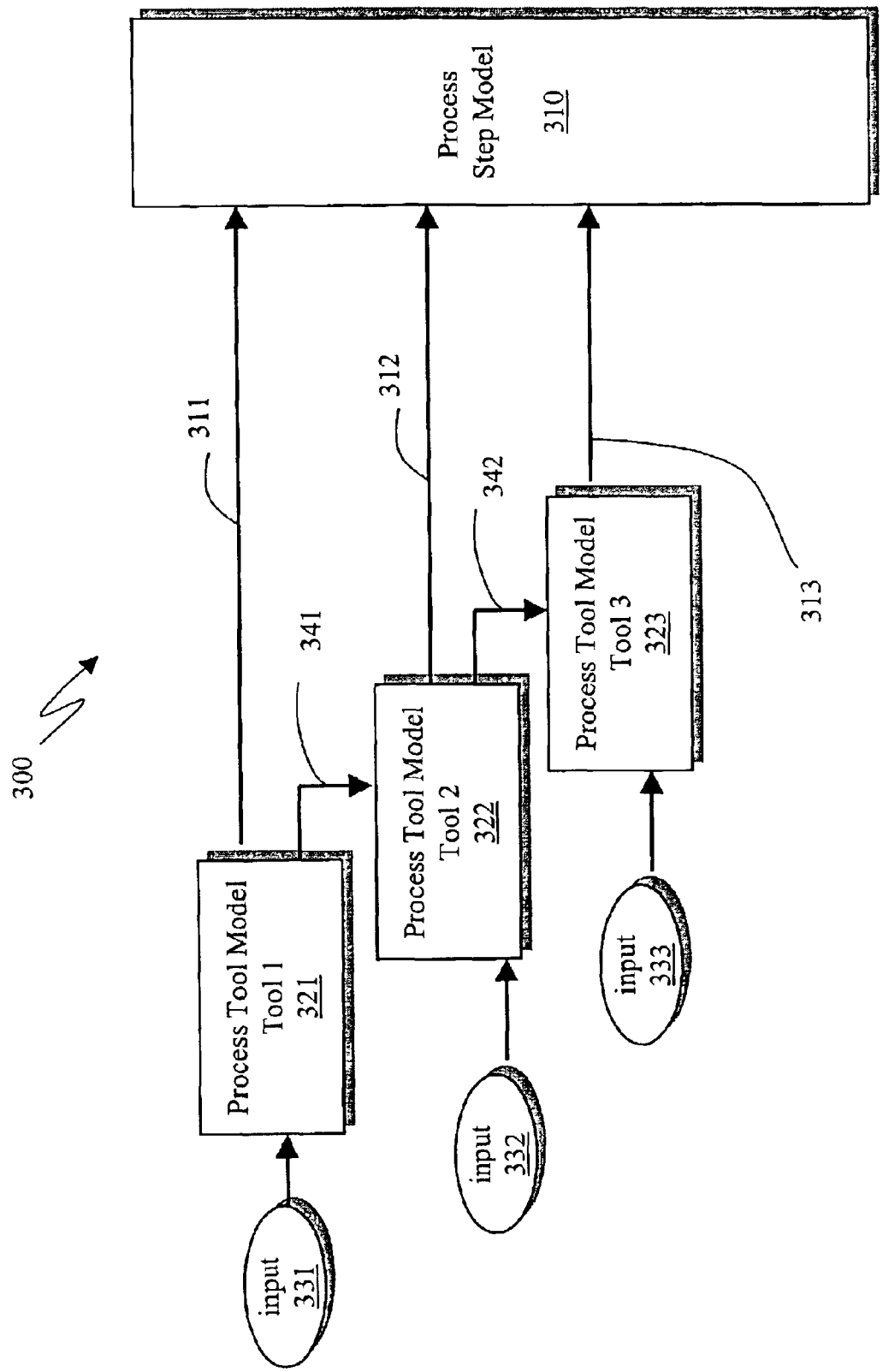
FIG. 3 is a schematic illustration of various embodiments of sub-system models generated according to the present invention.

In another aspect, the present invention provides a sub-system model for a selected process step comprised of one or more process-tool models for the process step. Referring to FIG. 3, in one embodiment of the sub-system model 300, the inputs for the process-step model 310 of a selected process model comprise the outputs 311, 312, 313 of one or more nonlinear regression models for each of one or more process tools 321, 322, 323 that have been selected based on a sensitivity analysis of the outputs of the process-step model 310 on the process toll operational parameters. In one embodiment, the input of a process-tool nonlinear regression model comprises process-tool operational variables 331, 332, 333 for that process tool. In another embodiment, one or more of the outputs 341, 342 of a process tool nonlinear regression model are also used as inputs for the nonlinear regression model of the selected process tool that is used next in the process step. In one embodiment, the invention then uses the sub-system model to determine values for the operational variables of the selected process tools that produce one or more predicted process-step metrics that are as close as possible to one or more target process-step metrics.

Figure 4:
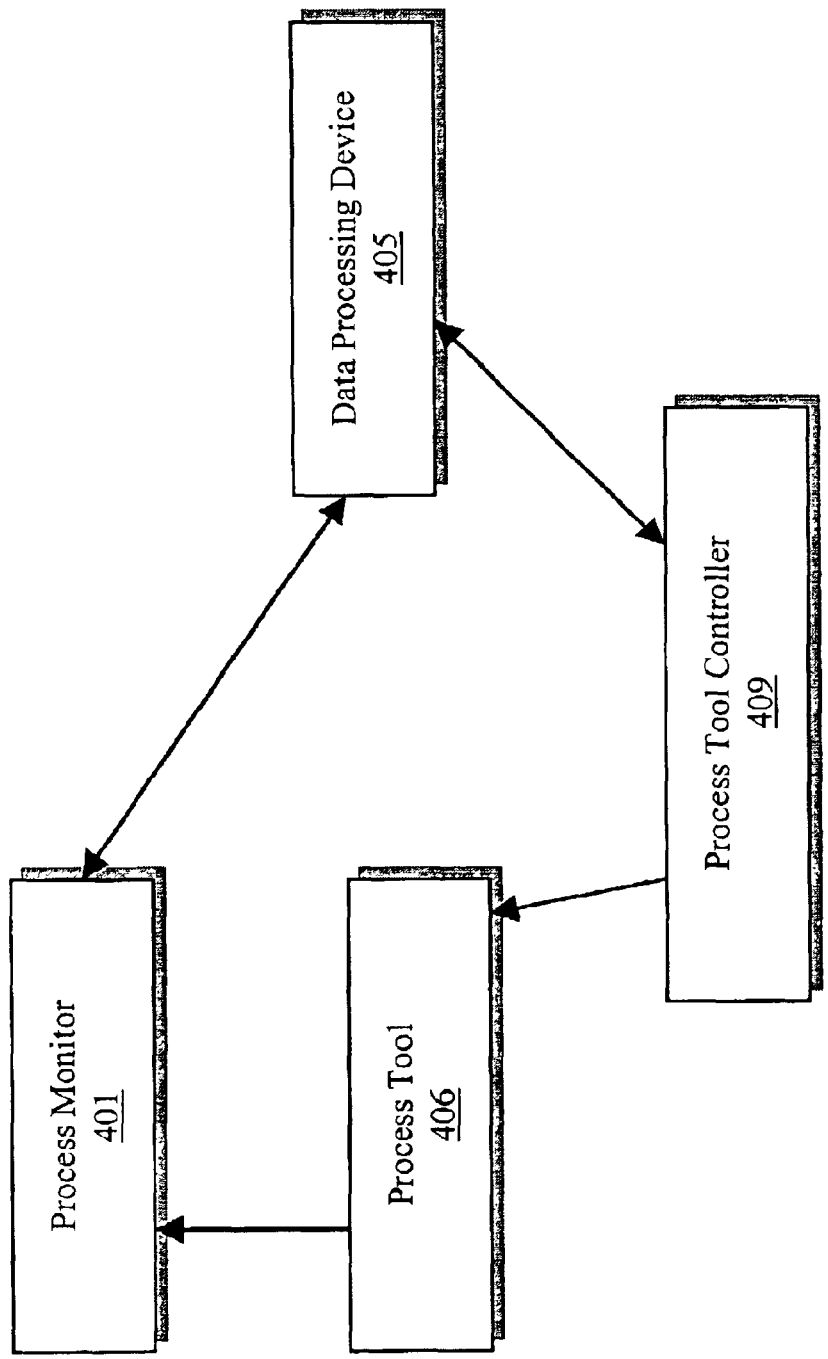
FIG. 4 is a schematic illustration of various embodiments of a system adapted to practice the methods of the present invention.

In other aspects, the present invention provides systems adapted to practice the methods of the invention set forth above. Referring to FIG. 4, in one embodiment, the system comprises a process monitor 401 in electronic communication with a data processing device 405. The process monitor may comprise any device that provides information on variables, parameters, or metrics of a process, process step or process tool. For example, the process monitor may comprise a RF power monitor for a sub-process tool 406. The data processing device may comprise an analog and/or digital circuit adapted to implement the functionality of one or more of the methods of the present invention using at least in part information provided by the process monitor. The information provided by the process monitor can be used, for example, to directly measure one or more metrics, operational variables, or both, associated with a process or process step. The information provided by the process monitor can also be used directly to train a nonlinear regression model, implemented using data processing device 405 in a conventional manner, in the relationship between one or more of process metrics and process step parameters, and process step metrics and process step operational variables (e.g., by using process parameter information as values for variables in an input vector and metrics as values for variables in a target output vector) or used to construct training data sets for later use. In addition, in one embodiment, the systems of the present invention are adapted to conduct continual, on-the-fly training of the nonlinear regression model.

In another embodiment, the system further comprises a process-tool controller 409 in electronic communication with the data processing device 405. The process-tool controller may be any device capable of adjusting one or more process-step or process-tool operational variables in response to a control signal from the data processing device. The process controller may comprise mechanical and/or electromechanical mechanisms to change the operational variables. Alternatively, the process controller may simply comprise a display that alerts a human operator to the desired operational variable values and who in turn effectuates the change. For example, the process tool controller may comprise a circuit board that controls the RF power supply of a process tool 406.

In some embodiments, the data processing device may implement the functionality of the methods of the present invention as software on a general purpose computer. In addition, such a program may set aside portions of a computer's random access memory to provide control logic that affects one or more of the measuring of process step parameters, the measuring of process metrics, the measuring of process-step metrics, the measuring of process-step operational parameters, the measuring of process-tool parameters; the provision of target metric values, the provision of constraint sets, the prediction of metrics, the implementation of an optimizer, determination of operational variables, generation of a system model from process-step models of selected process steps, and generation of a sub-system model (e.g., process-step model) from process-tool models of selected process tools. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

In another aspect, the present invention provides an article of manufacture where the functionality of a method of the present invention is embedded on a computer-readable medium, such as, but not limited to, a floppy disk, a hard disk, an optical disk, a magnetic tape, a PROM, an EPROM, CD-ROM, or DVD-ROM. The functionality of the method may be embedded on the computer-readable medium in any number of computer-readable instructions, or languages such as, for example, FORTRAN, PASCAL, C, C++, Tcl, BASIC and assembly language. Further, the computer-readable instructions can, for example, be written in a script, macro, or functionally embedded in commercially available software (such as, e.g., EXCEL or VISUAL BASIC).

EXAMPLE

Integrated Circuit Fabrication Transistor Gate and Gate Formation Process

An illustrative description of the invention in the context of transistor gate formation in the manufacture of semiconductor devices is provided below. However, it is to be understood that the present invention may be applied to any semiconductor manufacturing process including, but not limited to, plasma etch processes, metalization processes and via formation processes. In addition, it should be recognized that the present invention is generally applicable to any multi-step manufacturing processes (such as, for example, automobile fabrication and petroleum refining), and multi-step decision support processes, such as database mining.

The Transistor Gate and Gate Formation Process

Figure 5:
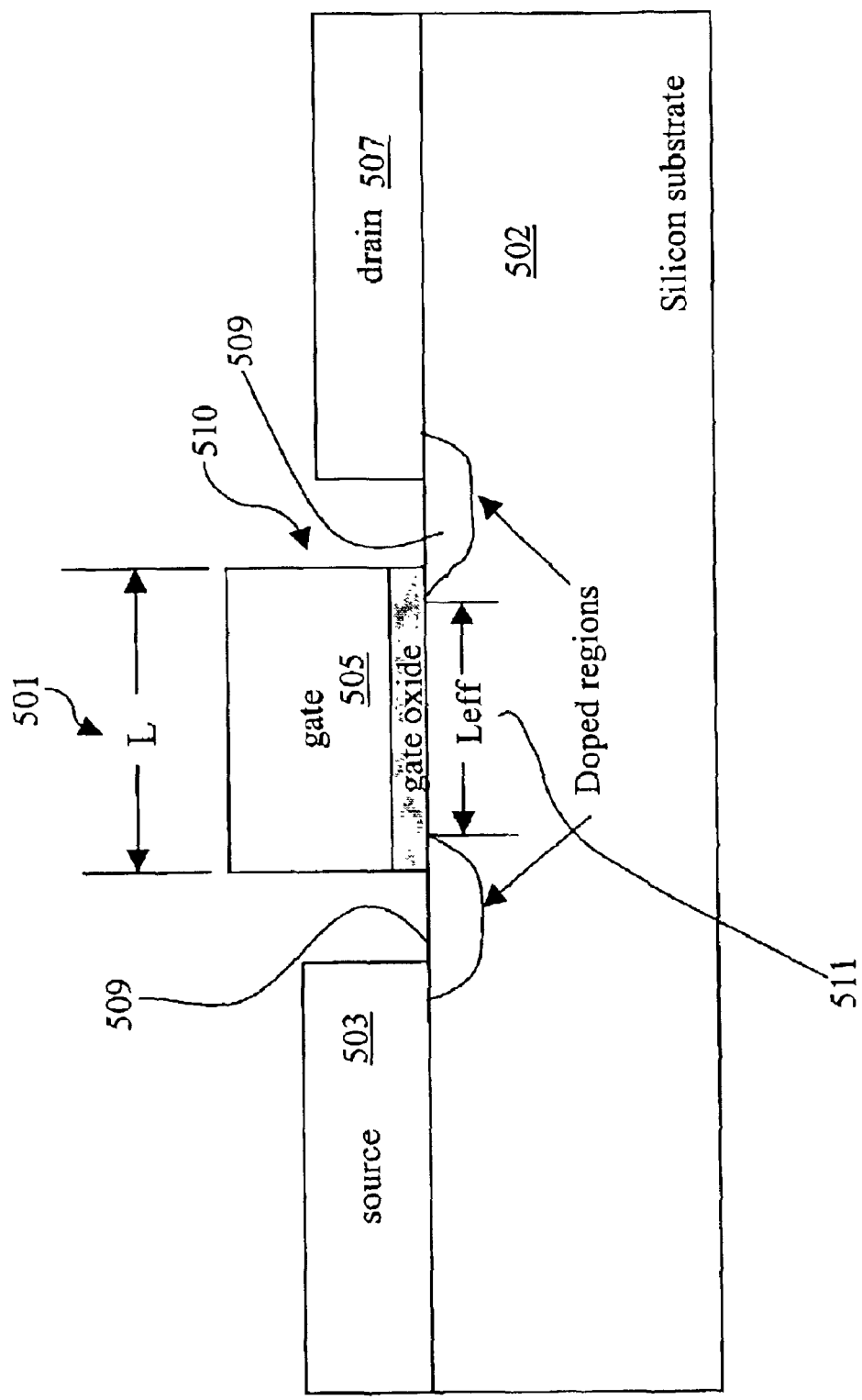
FIG. 5 is a schematic illustration of an illustrative integrated circuit transistor gate structure.

As the semiconductor devices shrink on VLSI ("very large scale integration") chips the main dimension that summarizes the size is the gate width or channel length. Typically, a 0.5-micron-technology chip has transistor gates printed at a width of 0.5 microns. This printed length or the physical gate length, L, 501 is shown in FIG. 5. The region of the substrate 502 between the source 503 and gate 505 and between the drain 507 and gate 505 is doped (509) with specific types of ions to enhance some of the characteristics of the transistors. These ions are typically "injected" by an implant device and then the ions are induced to diffuse by a thermal treatment known as annealing. Although great care is typically taken during the manufacturing to limit the diffusion of the ions under the gate structure 510, some spreading is inevitable. This has the effect of reducing the gate length 501 to an effective gate length 511. The effective length, $L_{eff}$, is typically measured by electrical tests of the speed of the transistor after manufacturing and is given by the relation, $$L_{eff} = L - 2\lambda \qquad \text{Eq. (3)},$$

where $\lambda$ is the lateral distance that the source and drain ions extend under the gate, and L is the "printed" length. The factors that influence effective gate length include, for example, the pattern density of the circuit, operating voltage for the device, and manufacturing processes such as ion implant, annealing, gate etch, lithographic development, etc.
The Initial Process Model The initial process model of this example comprises 22 process steps that have been determined to primarily define the gate structures on the integrated circuit and thus have a primary and/or secondary impact on $L_{eff}$ (based on reports regarding an actual semiconductor device manufacturing process). The following Table 1 lists the 22 process steps comprising the initial process model.

TABLE 1

| | |
|---|---|
| A1 | implant P, for threshold voltage adjust |
| A2 | hard mask etch, gate level |
| A3 | poly gate etch |
| A4 | implant P for lightly doped drain |
| A5 | implant B, lightly doped drain |
| A6 | implant As for source/drain |
| A7 | implant B for source/drain |
| B1 | deposit gate oxide |
| B2 | anneal diffuse of lightly doped drain |
| B3 | RTA reflow for window 1 |
| B4 | forming gas anneal |
| C1 | diffuse P into poly |
| C2 | deposit poly |
| C3 | spacer etch |
| C4 | flow BPTEOS dielectric 1 glass |
| C5 | RTA metal 1 barrier anneal |
| D1 | deposit hard mask for gate etch |
| D2 | IV measurements, Leff, Ion, Isub, poly width |
| P1 | apply photo resist for gate |
| P2 | expose PR for gate |
| P3 | develop PR for gate |
| P4 | measure PR for gate |
| Y1 | measure line width after gate etch |

Most of the 22 process steps are in the early stages of manufacturing. Nevertheless, process steps are scattered throughout the approximately 300-step manufacturing route. Accordingly, interspersed between the 22 process steps are other process steps that were determined not to have a primary or secondary effect on the effective channel length. For the purposes hereof, these 22 process steps are referred to as a mini-fab. The output variables for the process in this example are $L_{eff\_N}$, $L_{eff\_P}$, $I_{on}$, $I_{sub}$, and Poly-width. $L_{eff\_N}$ and $L_{eff\_P}$ refer, respectively, to effective line width, measured electronically, for N-type and P-type semiconductors, or the N and P regions of a bipolar transistor. $I_{on}$ and $I_{off}$ refer, respectively, to the current passing through a transistor when it is switched on and when it is switched off. $I_{sub}$ refers to the current passing through the substrate. Poly_width refers to a line width measurement of the polysilicon emitter region of a bipolar transistor.

Although only process steps with effects on the metric of effective channel length are considered in this example, it should be recognized that first-order and second-order process steps for other metrics may be considered. For example, in the case of database mining, first- and second-order causal relations may be considered.

The initial nonlinear regression process model of this example is a neural network model. The neural network architecture has 25 possible input variables per process step, 25 binary variables (representing the product code) and three additional scalar variables representing processing time and pattern density. As a result, there is a total of 578 possible input variables to the neural network. This results in an excess number of inputs so that the neural network has extra capacity, thereby facilitating quick adaptation to inclusion of new input variables to the initial process model. The output vector from the initial process model is also provided with excess capacity to facilitate quick adaptation to inclusion of new output variables in the initial process model. In this example, only a little over one hundred inputs are generally active for training the neural network. The remainder of the inputs represent excess capacity.

Figure 6B:
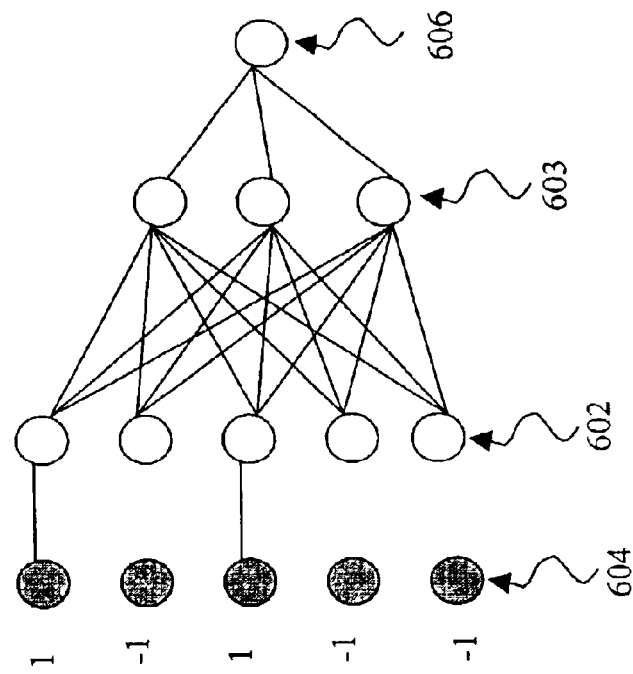
FIGS. 6A–6B are schematic illustrations of illustrative embodiments of neural networks discussed in the Example.
Figure 6A:
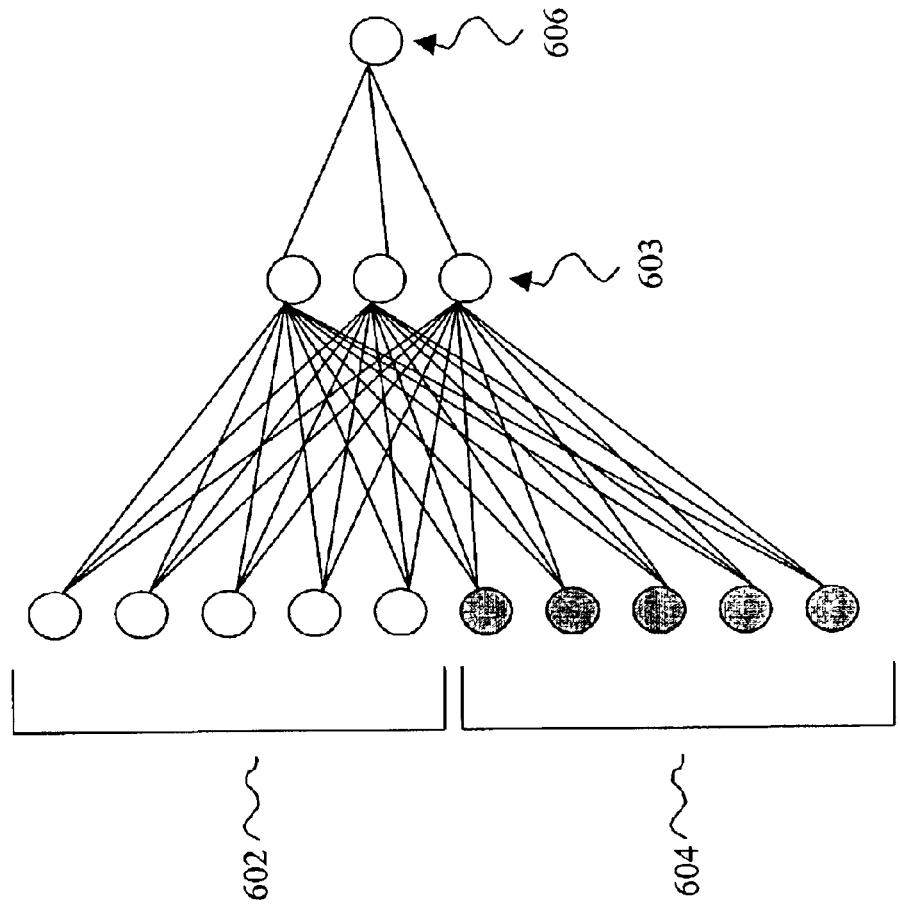

An example of training a neural network with excess capacity is illustrated by FIGS. 6A and 6B. In FIGS. 6A and 6B, an input vector of five scalar elements 602 and an output vector of one element 606 is shown. Associated with the five-element scalar input vector is a five-element binary vector 604. The filled nodes in FIGS. 6A–B represent binary elements (i.e., −1 or +1), and the open nodes represent scalar elements. The binary input vector 602 acts as a signal to indicate which elements in the scalar input vector 604 the neural network (e.g., the layer of hidden nodes 603) is to "listen to" during the training. In the network architecture of FIG. 6A, the input dimensionality on the network is 10. An alternative approach is shown in FIG. 6B. In this example the binary vector 604 acts as a gating network to indicate which inputs in the scalar vector 602 to feed forward to the hidden nodes 603. The others are not fed forward. The input dimensionality for the network of FIG. 6B is five. For the actual gating inputs shown in FIG. 6B the input dimensionality is two. The initial process model of the present example uses the approach illustrated in FIG. 6B to reduce in the actual dimensionality for training.

In the initial process model of the present example, the gating network reduces the dimensionality from a potential 578 to 131. This leaves 447 inputs as excess capacity in the network. Such excess capacity in an initial process model facilitates its ability to adapt to new generations of technology, system processing tools being brought on-line, increased manufacturing capacity, new inline measurements, and new end-of-processing measurements. Accordingly, it is to be understood that the initial process models of the present invention do not require excess capacity; rather, the initial process models only require capacity sufficient to model all desired input variables and output variables.

In addition to a gating vector (or gating network) to determine which inputs will be fed forward, in the present example the initial process model also comprises a gating network to determine which outputs are fed back during the backpropagation phase of training the network. Schematically the entire $L_{eff}$ model is shown in FIG. 3.

Figure 7:
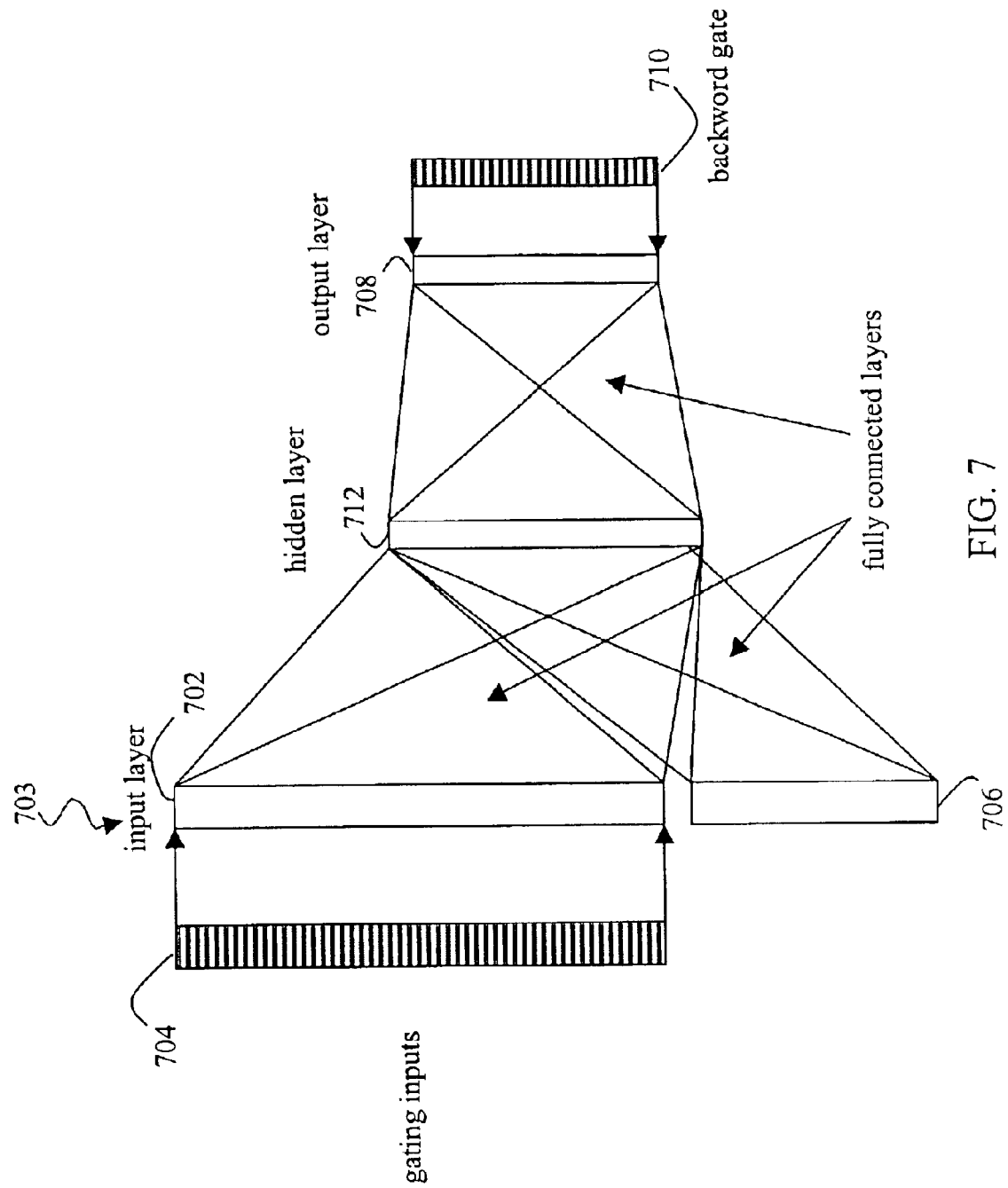
FIG. 7 is a schematic illustrating the training of an embodiment of a neural network with excess capacity.

Referring to FIG. 7, the input layer of the initial process model comprises a 550-element process-step scalar vector 702, which represents the 25 possible input variables for each of the 22 process steps. Associated with the process step vector 702 is a gating vector 704. In addition, the input layer 703 comprises an additional 25 binary inputs and three scalar inputs in the supplemental vector 706. The neural network has 25 outputs 708 that have an associated gate vector 710 for training the network. As noted above, the neural network has 578 inputs and 25 outputs. Of these only 131 are active inputs and five are active outputs. The network has one "hidden layer" 312 with 20 hyperbolic tangent nodes, and so there are a total of 2740 adjustable connections (132×20+20×5). Both the input layer 703 and the hidden layer 712 also include a bias node set at constant 1.0. This allows the nodes to adjust the intersection of the hyperbolic tangent sigmoids.

Training the Initial Process Model

Figure 8:
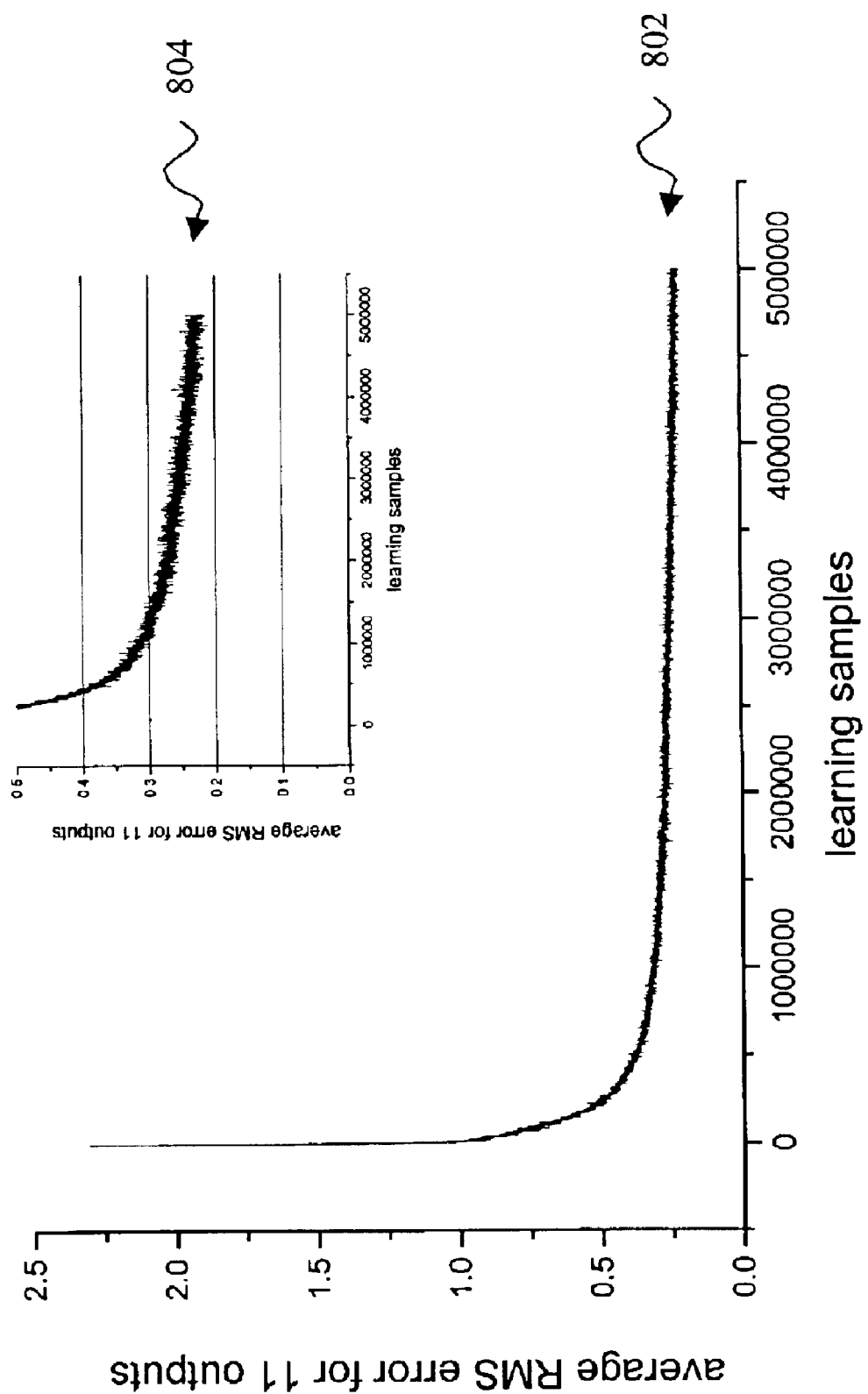
FIG. 8 is an example of the overall learning curve for the initial process model of the Example.

The initial process model of the present example was trained substantially according to Eq. (2) with 5000 lots of wafers. FIG. 8 is an example of the overall learning curve for the initial process model. The curve 802 represents the average of the RMS error for each of the 5 outputs. That is, the RMS error is calculated for each output and the errors are averaged. The curve in the inset 804 is an "enlargement" of the curve 802. The curve 802 shows that after 5 million learning iterations, the neural network was still learning, but that the average RMS error is about 0.20. This implies that the model can explain on average about 80 percent of the variance for the combined outputs.

Figure 9:
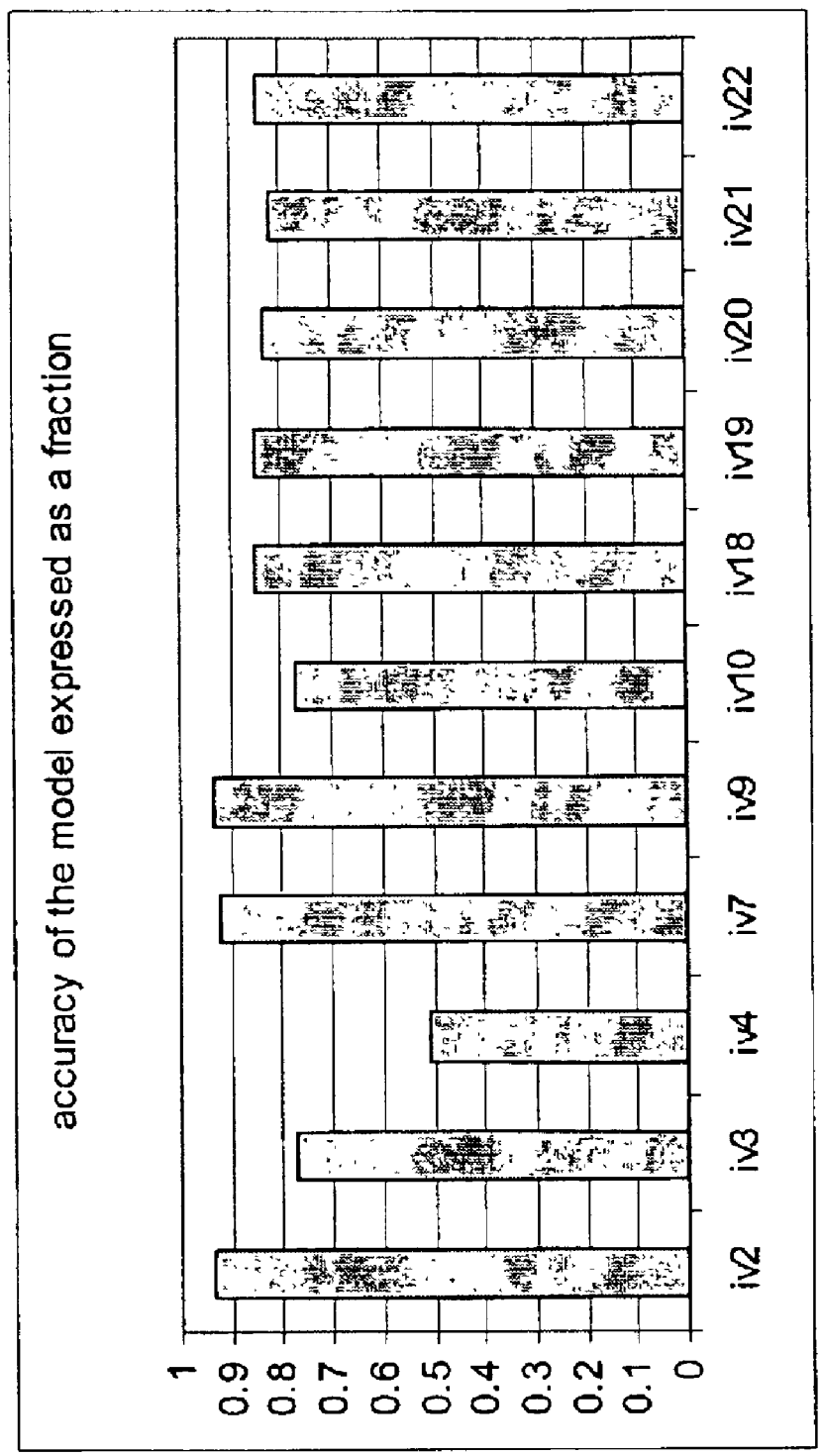
FIG. 9 is a bar chart of the accuracy of the trained initial process model, expressed as a fraction on the y-axis, for various individual outputs, x-axis, of the model.

The amount of variance explained by the initial process model for the individual outputs is shown in the bar chart of FIG. 9, and the individual outputs are $L_{eff\text{-}N}$, $L_{eff\text{-}P}$, $I_{on}$, $I_{sub}$, and Poly-width. For example, referring to FIG. 9, slightly over 90% of the variance in the 0.6 micron technology N-channel $L_{eff}$ (i.e., $L_{eff\text{-}N}$) is explained by the model, shown by the bar labeled iv2. The following Table 2 lists the short form of the labels in FIG. 9 and the corresponding metric process and technology they represent:

TABLE 2

| Short Name | Output Description |
| --- | --- |
| iv2 | Le__NHC.6X15__B |
| iv3 | Le__N__0.5X15__B |
| iv4 | Le__N__0.6X15__B |
| iv7 | Le__N__.5X15__B |
| iv9 | Le__PHC.6X15__B |
| iv10 | Le__P__0.6X15__B |
| iv18 | N__.5X15__H__Isub |
| iv19 | N__.5X15__V__Ion |
| iv20 | N__.6X15__H__Isub |
| iv21 | N__.6X15__V__Ion |
| iv22 | PY1__Width__0.6 |

Sensitivity Analysis

After an initial process model is constructed or provided, a sensitivity analysis is performed to identify the driving factors for the process metric of this example, i.e., effective channel length $L_{eff}$. It should be understood, however, that in reality the driving factors for a process metric may vary. For example, product code may be the primary driving factor one week, and gate etch the next.

The present example illustrates two approaches to sensitivity analysis. In one embodiment, the sensitivity-analysis approach constructs response curves (surfaces). In another embodiment, the sensitivity analysis approach constructs a Pareto chart or bar chart. It should be recognized that in another embodiment, these approaches may be combined.

In the present transistor gate example, sensitivity analysis is conducted as follows. In this example, the input and output data are normalized for zero mean and unity standard deviation. For each of the individual process steps there are several inputs (e.g., process step metrics such as mean value and standard deviation for film thickness and mean value and standard deviation of sheet resistance). Inputs that are clearly coupled to each other are "varied" in parallel. The variations were performed by incrementally changing the relevant set of inputs by 0.1 starting at −1.0 and ending at 1.0. Thus, there were a total of 21 sets of incremental inputs. All the other inputs to the neural network were set to the mean value of 0.0. After each feedforward, curves similar to those shown in FIG. 6 may be obtained and plotted.

Referring to FIG. 10, four sensitivity curves 1002, 1004, 1006, 1008, are shown. The entire range of input results in sigmoid curves for the output. For example, The curve labeled "A3" 1002 shows the sensitivity of the poly gate etch process on the P-channel electrical line width ($L_{eff}$) for a 0.6 micron technology, step A3 of Table 1. The other curves 1004, 1006, 1008, refer to other process steps, which can be decoded by one of ordinary skill in the art with the use of Table 1. When a curve has a positive slope, this indicates a positive correlation. For example, for the "A3" curve 1002 (the gate etch) this indicates that more oxide remaining gives a higher $L_{eff}$. The other curves can be interpreted similarly.

For each process steps listed in Table 1, a whole set of sensitivity curves may be generated. By measuring the slope (for example in the indicated region 1009 of FIG. 10) a Pareto chart of the individual process steps (Table 1) may be produced. Typically, the absolute value of the slope is used in preparing the Pareto chart since typically one wants to find which processing step has greatest impact. The direction of correlation is lost by this step, however. The five Pareto charts (one for each output variable) determined for the present example by this approach are shown in FIGS. 11–15. The corresponding output variable is labeled at the top of each graph in FIGS. 11–15.

Identification of Driving Factors and Process Step Selection

After the sensitivity analysis is conducted, the results are used to select the process steps for inclusion in a system process model. The process steps are selected based on the sensitivity of the process metrics (i.e., outputs in this example) with respect to the process steps. The process steps that most significantly impact one or more process metrics are identified as driving factors for the process.

In this example, one Pareto chart is used for each output (i.e., $L_{eff\_N}$, $L_{eff\_P}$, $I_{on}$, $I_{sub}$, Poly-width) to select the process steps having most impact on that particular output. For example, referring to FIG. 11, the bars labeled A5, B2 and P4 show that the top three process steps in term of impact on $L_{eff\_N}$ are process steps A5, B2 and P4. Accordingly, in this example process steps A5, B2 and P4 are selected for generation of a system process model based on models for theses selected process steps. However, it should be understood that other process steps may be included. For example, the bar labeled B1 indicates that process step B1 has a somewhat less impact on $L_{eff\_N}$ than step B2. Accordingly, in another embodiment of this example, process step B1 may be considered to have a significant impact on $L_{eff\_N}$, and thus, a model for this process step is included in the system process model.

According to one embodiment of the invention, a sensitivity analysis is performed for one or more of the selected process steps (i.e., those identified as driving factors of the process). For example, further Pareto analysis may be performed to determine which process tools are having a significant impact on the relevant metric (in the example of FIG. 11 this is $L_{eff\_N}$).

Figure 16:
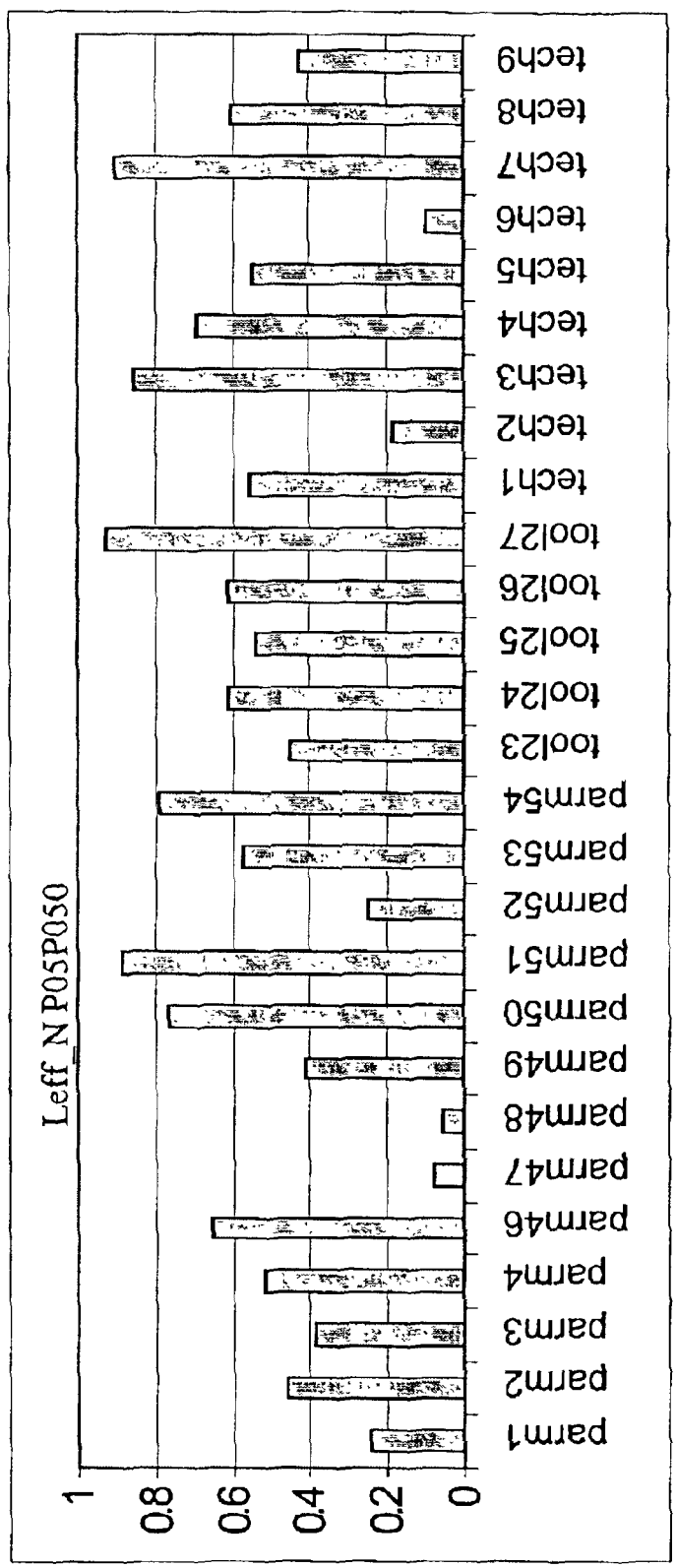
FIG. 16 is a Pareto chart for the inputs, x-axis, into a model of one process step of the process.

The Pareto results from a nonlinear regression model for the photodevelopment process step P4, similar to the neural network model discussed for the initial process model, are shown in FIG. 16. However, it should be recognized that similar models can be built and sensitivity analysis conducted for other selected process steps.

Referring to FIG. 16, the effects of 13 inline measurements made after the photodevelopment step (P4 in Table 1) are shown, bars with labels staring with the prefix "p arm." Some of the inline measurements represent the line width after developing the photoresist and others are a result of monitoring the intensity and focus during exposure. The Pareto analysis also includes the processing tools for the process step, bars with labels staring with the prefix "tool," and different technologies (e.g., products), bars with labels staring with the prefix "tech." For example, the heights of the bars labeled "tech3" and "tech7" indicate that technology 3 and 7 are the most sensitive, relative to other technologies, with respect to $L_{eff\_N}$. In addition, the height of the bar labeled "tool27," relative to the other bars, indicates that tool #27 is having the largest impact on $L_{eff\_N}$ for process step P4. Accordingly, in one embodiment, the system process model comprises a nonlinear regression model of process tool 27.

Accordingly, as illustrated by this example, the present invention with an initial process model may conduct on-line sensitivity analysis to determine the process steps that have significant impact on the process metrics; this can take place on an ongoing basis to understand the changes affecting the process metrics. Furthermore, the system process model has the ability to provide quantitative metrics related to process step failure within the process and subsystem failure within the individual processing tools comprising the manufacturing system.

The System Process Model

Figure 17:
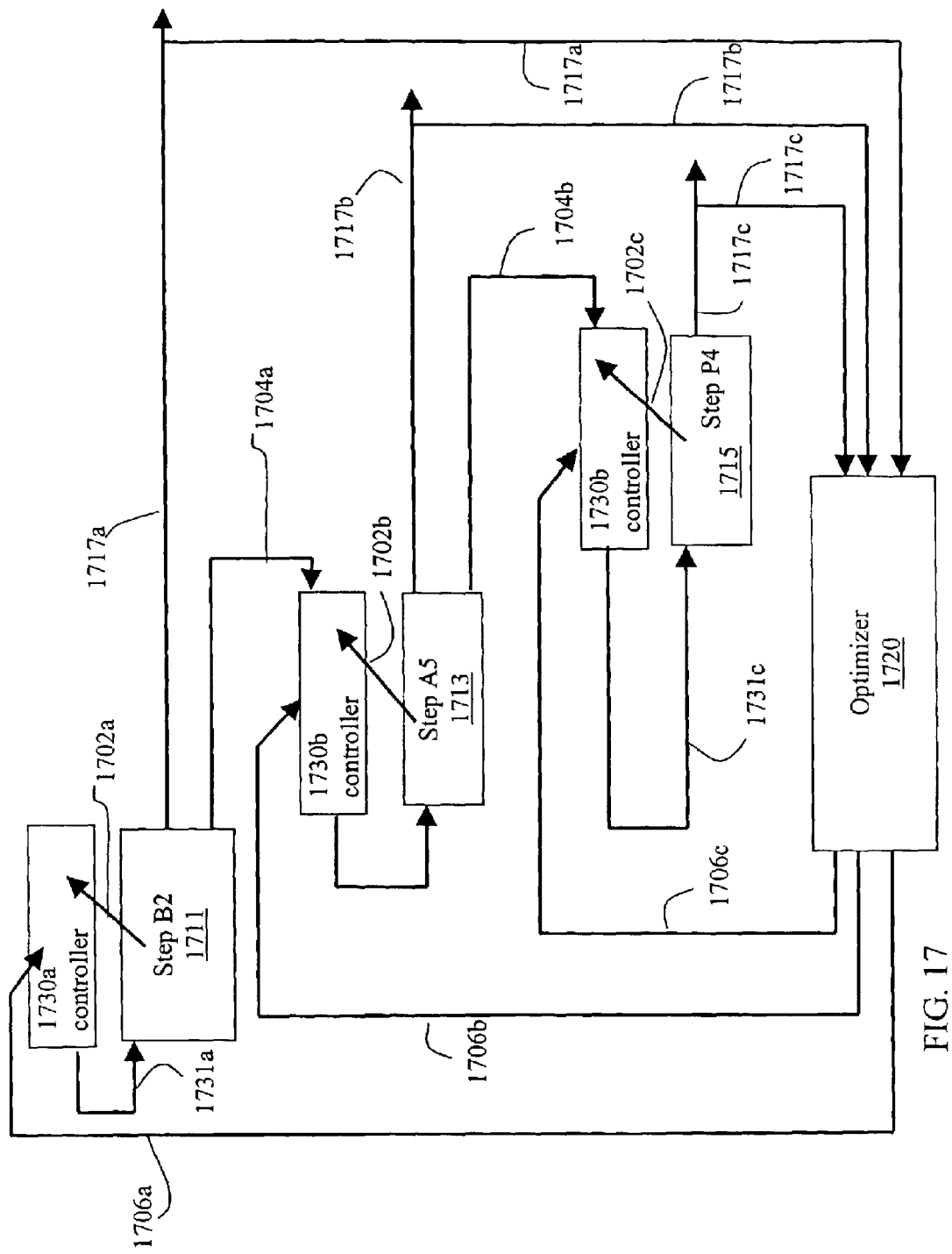
FIG. 17 is a schematic illustration of one embodiment of a system model for the process of the Example generated according to one embodiment of the methods of the invention.

Referring to FIG. 17, a schematic illustration of one embodiment of a system process model for the present example is shown. The system process model of FIG. 17 includes both feedback 1702a, 1702b, 1702c and feedforward 1704a, 1704b, 1704c control, and includes optimization control signals 1706a, 1706b, 1706c. The system process model comprises nonlinear regression models for specific process tools. In this example, process-tool models were generated from historical data for the tool, available, for example, from production databases. The nonlinear regression models of process step B2 (1711), step A5 (1713), and step P4 (1715), each have associated output variables 1717a, 1717b, 1717c that include the relevant inline measurements (e.g., line width, film thickness), and an estimate of the end-of-process metrics ($L_{eff}$ for the illustration of FIG. 17). In addition, as illustrated in FIG. 17, the system process model of this example further comprises an optimizer 1720.

The optimizer 1720 uses the output variables from each process-step model (e.g., B2, A5, and P4) to determine process-step operational-variable values 1706a, 1706b, 1706c (i.e., input parameters for the process step and/or process tools of a step) that produce at substantially lowest cost a predicted process metric (in this example $L_{eff}$) that is substantially as close as possible to a target process metric. In one embodiment of the example of FIG. 17, a genetic optimizer (i.e., an optimizer comprising a genetic algorithm) is used.

In one embodiment, one or more of the process-step models and process-tool models that comprise the system process model each have an associated optimizer to determine operational variable values that produce at substantially lowest cost a predicted process metric that is substantially as close a possible to a target process metric. In another embodiment, the system process model comprises an optimizer that optimizes the entire set of operational parameters for the selected process tools and selected process steps together.

In one embodiment, signals corresponding to the appropriate process-step operational-variable values are sent to a process controller 1730a, 1730b, 1730c. In another embodiment, of the present invention (illustrated in FIG. 13), feedback information 1702a, 1702b, 1702c is provided to the process controller. The feedback information aids the individual process controller 1730a, 1730b, 1730c in refining, updating or correcting the operational variable values provided by the optimizer by including both in situ process signatures as feedback 1702a, 1702b, 1702c and performance information (feedforward information) 1704a, 1704b from the previous process step.

Figure 18:
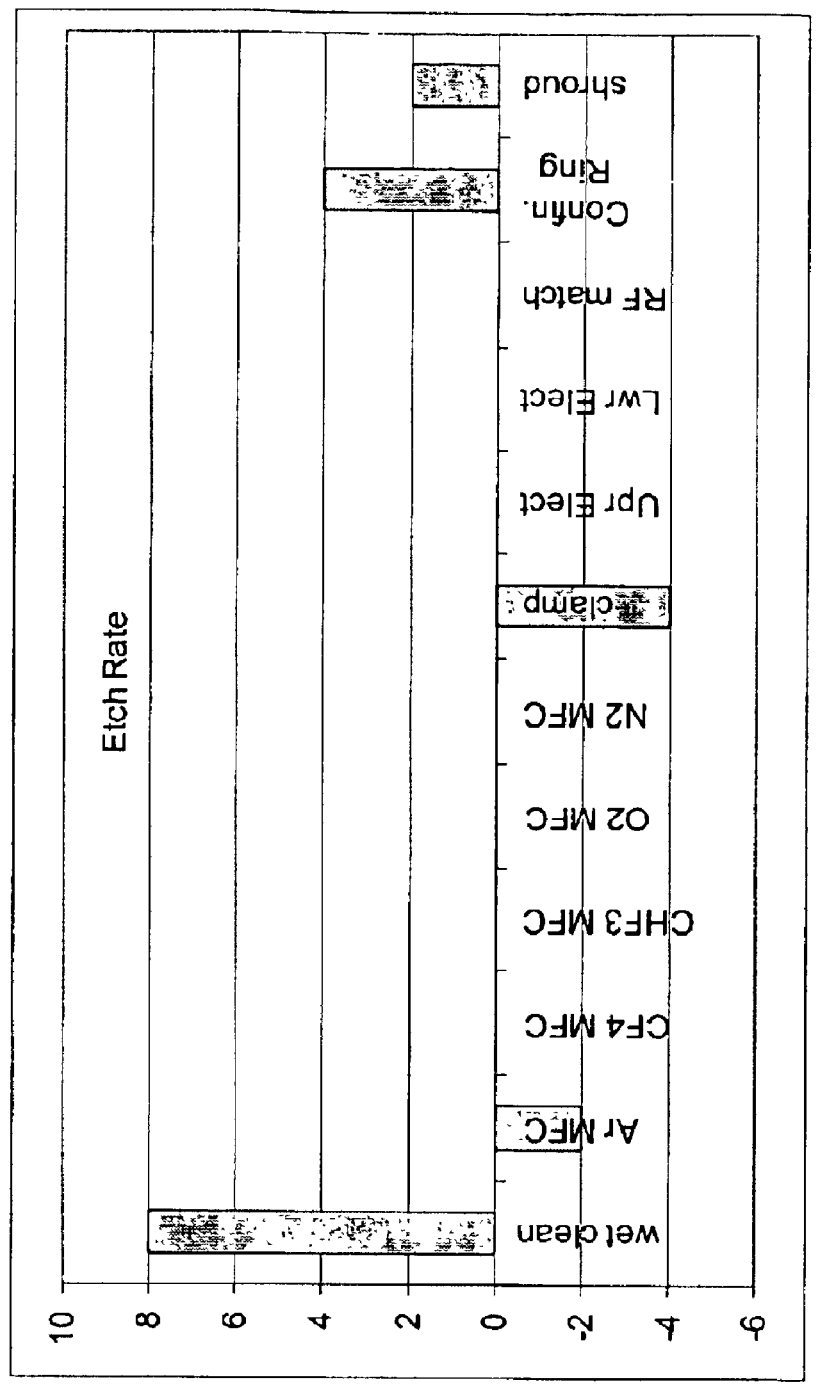
FIG. 18 is an example of an optimizer signal for optimization of a process metric of a process.

The process controller may comprise mechanical and/or electromechanical mechanisms to change the operational variables. Alternatively, the process controller may simply comprise a display that alerts a human operator to the desired operational variable values and who in turn effectuates the change. One example of an optimizer signal in the context of an etch process utilized during the manufacture of integrated circuits is shown in FIG. 18, which is an example of a Pareto chart for the process metric of etch rate. However, unlike the above Pareto charts, the chart of FIG. 18 is the result of a multidimensional optimization and not a sensitivity analysis. The operational variables listed along the abscissa are replacement variables, e.g., corresponding to part replacement or maintenance. The bar labeled "wet clean" has an absolute value greater than any other, indicating that conducting a wet clean is an appropriate operational value to optimize the etch rate process metric (e.g., the variable representing a wet clean has two values, one which indicates clean and the other the which indicates do not clean).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of generating a system model of a process comprising a plurality of sequential process steps, the method comprising the steps of:
   providing an initial process model that has been trained in the relationship between one or more metrics of the process and one or more operational variables of a plurality of process steps;
   providing a process-step model for each of one or more of the plurality of process steps selected based on a sensitivity analysis of the initial process model; and
   generating a system model from the one or more process-step models, wherein one or more outputs of the model for one selected process step comprises the input of the model of another selected process step.

2. The method of claim 1, wherein the step of generating a system model further comprises providing an optimizer to determine values for one or more operational variables of the selected process steps within an operational variable constraint set that produce at a substantially lowest cost a predicted process metric the process as close as possible to a target process metric for said process.

3. The method of claim 2, wherein the optimizer associates costs with at least one of the process step operational variables.

4. The method of claim 1, further comprising the step of:
   providing a model for each of one or more process tools of the selected process steps, the process tools being selected based on a sensitivity analysis of the model for a selected process step.

5. The method of claim 4, further comprising the step of:
   generating a sub-system model for a selected process step from the one or more process-tool models, wherein one or more outputs of the model for one selected process tool comprises the input of the model of another selected process tool.

6. The method of claim 5, wherein the step of generating a sub-system model further comprises providing an optimizer to determine values for one or more operational variables of the selected process step within an operational variable constraint set that produce at a substantially lowest cost a predicted process step metric for the process step as close as possible to a target process step metric for said process step.

7. The method of claim 1, wherein at least one of the initial process model, the process-step models, and the system model comprise a neural network.

8. The method of claim 5, wherein at least one of the initial process model, the process-step models, the system model, the process-tool models, and the sub-system model comprise a neural network.

9. A computer-readable medium comprising:
   instructions for providing an initial process model that has been trained in the relationship between one or more metrics of the process and one or more operational variables of a plurality of process steps;
   instructions for providing a process-step model for each of one or more of the plurality of process steps selected based on a sensitivity analysis of the initial process model; and
   instructions for generating a system model from the one or more process-step models, wherein one or more outputs of the model for one selected process step comprises the input of the model of another selected process step.

10. The article of manufacture of claim 9, further comprising:
    instructions for providing a model for each of one or more process tools of the selected process steps, the process tools being selected based on a sensitivity analysis of the model for a selected process step; and
    instructions for generating a sub-system model for a selected process step from the one or more process-tool models, wherein one or more outputs of the model for one selected process tool comprises the input of the model of another selected process tool.

11. A method for control and optimization of a process, the process comprising a plurality of sequential process steps, the method comprising the steps of:
    providing a system model comprised of one or more process-step models, said process steps being selected based on a sensitivity analysis of an initial process model, wherein one or more outputs of the model for one selected process step comprises the input of the model of another selected process step; and
    using an optimizer to determine values for one or more operational variables of the selected process steps within an operational variable constraint set that produce at a substantially lowest cost a predicted process metric for the process as close as possible to a target process metric for said process.

12. The method of claim 11, further comprising the step of:
    providing a model for each of one or more process tools of one or more of the selected process steps, the process tools being selected based on a sensitivity analysis of the model for a selected process step.

13. The method of claim 12, further comprising the step of:

using an optimizer to determine values for one or more operational variables of the selected process tools within an operational variable constraint set that produce at a substantially lowest cost a predicted process metric for the process as close as possible to the target process metric.

14. The method of claim 11, further comprising the step of:

providing a sub-system model for a selected process step comprised of one or more process-tool models, said process tools being selected based on a sensitivity analysis of the process-step model of the selected process step, wherein one or more outputs of the model for one selected process tool comprises the input of the model of another selected process tool; and using an optimizer to determine values for one or more operational variables of the selected process tools within an operational variable constraint set that produce at a substantially lowest cost a predicted process step metric for the selected process step as close as possible to a target process step metric for said selected process step.

15. The method of claim 11, wherein at least one of the system model and the process-step models comprise a neural network.

16. The method of claim 14, wherein at least one of the system model, the process-step models, and the process-tool models comprise a neural network.

17. A computer-readable medium comprising:

instructions for providing a system model comprised of one or more process-step models, said process steps being selected based on a sensitivity analysis of an initial process model, wherein one or more outputs of the model for one selected process step comprises the input of the model of another selected process step; and instructions for using an optimizer to determine values for one or more operational variables of the selected process steps within an operational variable constraint set that produce at a substantially lowest cost a predicted process metric for the process as close as possible to a target process metric for said process.

18. The article of manufacture of claim 17, further comprising:

instructions for providing a sub-system model for a selected process step comprised of one or more process-tool models, said process tools being selected based on a sensitivity analysis of the process-step model of the selected process step, wherein one or more outputs of the model for one selected process tool comprises the input of the model of another selected process tool; and instructions for using an optimizer to determine values for one or more operational variables of the selected process tools within an operational variable constraint set that produce at a substantially lowest cost a predicted process step metric for the selected process step as close as possible to a target process step metric for said selected process step.

19. A system for control and optimization of a process, the process comprising a plurality of sequential process steps effectuated by one or more process tools, the system comprising:

a process monitor in electronic communication with one or more process tools;

a data processing device in electronic communication with the process monitor, wherein in said data processing device is adapted to generate a system model of the process comprised of one or more process-step models, said process steps being selected based on a sensitivity analysis of an initial process model, and where one or more inputs to one or more of the models of the selected process steps is based at least in part on information provided by the process monitor to the data processing device; and a process-tool controller in one or more of mechanical, electrical, or electromechanical communication with one or more process tools and adapted to adjust an operational variable of the one or more process tools in response to a control signal from the data processing device.

20. The system of claim 19, further comprising an optimizer adapted to determine values for one or more operational variables of one or more process tools within an operational variable constraint set that produce at a substantially lowest cost a predicted process step metric for the process step as close as possible to a target process step metric, wherein the control signal is based at least in part on the operational variable values determined by the optimizer.

* * * * *